(12) United States Patent
Shahar

(10) Patent No.: US 7,239,435 B2
(45) Date of Patent: Jul. 3, 2007

(54) HIGH-SPEED, HIGH RESOLUTION, WIDE-FORMAT CARTESIAN SCANNING SYSTEMS

(76) Inventor: Arie Shahar, 14 David Navon St., P.O. Box 8448, Moshav Magshimim (IL)

( * ) Notice: Subject to any disclaimer, the term of this patent is extended or adjusted under 35 U.S.C. 154(b) by 0 days.

(21) Appl. No.: 11/550,888

(22) Filed: Oct. 19, 2006

(65) Prior Publication Data
US 2007/0103749 A1 May 10, 2007

Related U.S. Application Data

(60) Provisional application No. 60/734,134, filed on Nov. 7, 2005.

(51) Int. Cl.
*G02B 26/08* (2006.01)
*H04N 1/21* (2006.01)
(52) U.S. Cl. ............ 359/210; 358/296; 358/494; 359/201; 359/212; 359/900
(58) Field of Classification Search .............. None
See application file for complete search history.

(56) References Cited

U.S. PATENT DOCUMENTS 6,466,352 B1 10/2002 Shahar et al.
6,735,005 B2 5/2004 Karin et al.
2004/0165923 A1 8/2004 Karin et al.

*Primary Examiner*—James Phan
(74) *Attorney, Agent, or Firm*—David Pressman

(57) ABSTRACT

A scanning system for writing, printing, direct imaging, plotting, computed radiography, and scanning includes an optical system contains at lest one modulatable radiation source for emitting radiation, a movable collimating lens, a reflector, and a focusing lens and a mechanical system containing a first mechanical carrier spinning about a first axis. A second mechanical carrier spins about a second axis. The second axis is mounted on the first mechanical carrier and is arranged to rotate about the first axis. A third mechanical carrier spins about a third axis. The third axis is mounted on the second mechanical carrier and is arranged to rotate about the second axis. The system also has a movable surface. The collimating lens is arranged to receive the radiation from the one radiation source and to convert it into at least one collimated beam which propagates along an optical path from the collimating lens to the surface via the reflector and the focusing lens to form at least one focused radiation spot on the surface. The mechanical system is arranged to cause the third mechanical carrier of the mechanical system to carry the reflector and the focusing lens of the optical system to move the one focused radiation spot on the surface along a straight line.

24 Claims, 21 Drawing Sheets

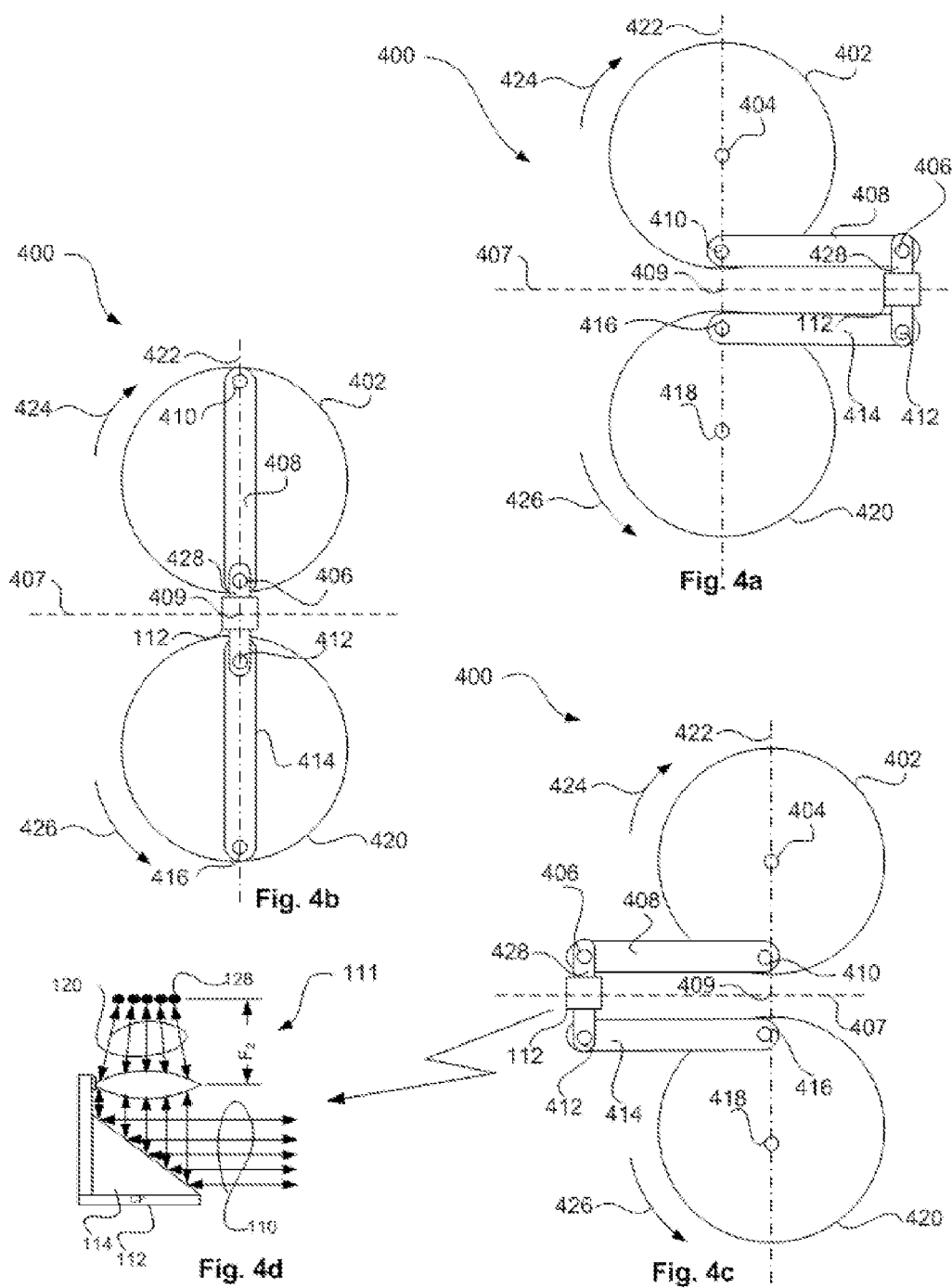

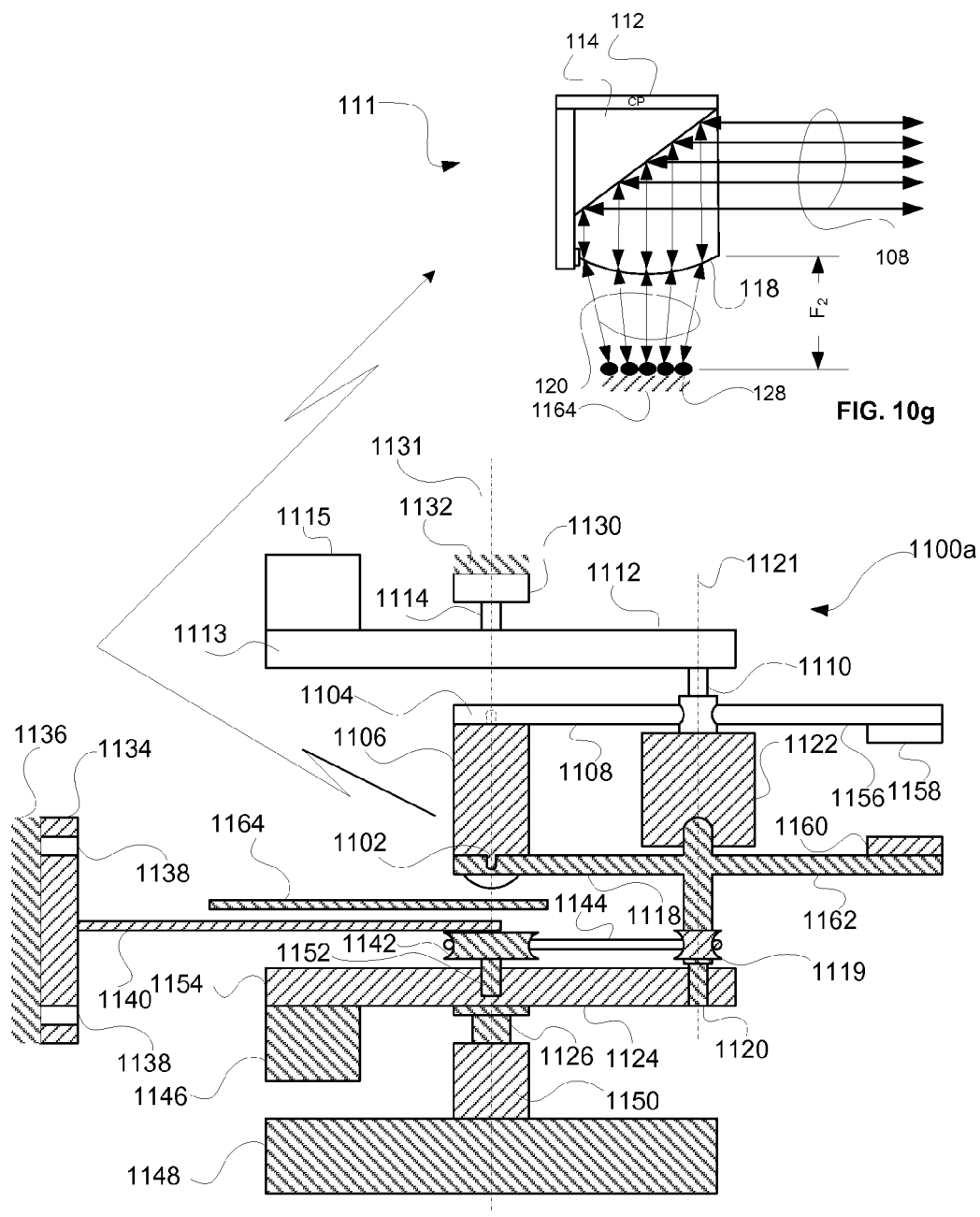

HIGH-SPEED, HIGH RESOLUTION, WIDE-FORMAT CARTESIAN SCANNING SYSTEMS

CROSS-REFERENCE TO RELATED APPLICATION

This patent issued from an application that claims priority of my copending provisional patent application Ser. No. 60/734,134, filed Nov. 7, 2005

BACKGROUND

1. Field

The fields of optical linear scanning and computed radiography systems include optical scanning systems for reading, inspecting, writing, and printing at high speed with high resolution and across wide ranges or formats.

2. Prior Art

Scanning at a very high speed along very wide scan ranges (on the order of magnitude of up to 1 m and even more) with very high resolution is needed in the fields of reading, inspecting, writing, and printing of and on Liquid Crystal Displays (LCDs), flat panels, High Definition Televisions (HDTVs) and plasma displays which are have a very wide format and need to be written and inspected with very high resolution.

The current systems for direct writing and imaging include a very large lens that covers the whole scanning area. Such a lens must have very high quality to enable high resolution and is extremely expensive. Accordingly, a scanning system that includes a small moving lens has an advantage. However, such a scanning system that scans at a very high speed along very wide ranges is not available yet.

The requirement for linear scanning at a high speed along wide ranges dictates the need for moving system that can work with the high accelerations associated in the direction changes of the scan when the scanning head moves back and forth.

U.S. Pat. No. 6,735,005 to Karin et al., entitled "Cartesian scanning system", May 11, 2004, discloses a linear scanning system including a moving head that receives collimated beam to reflect this beam as a focused beam onto a scanned surface.

US published patent application of Karin et al., entitled "Scanning mechanism for high-speed high-resolution scanning", May 11, 2004, Nr. 2004/0165923, discloses a mechanism for the moving system of the scanning head of the Karin et al. US patent.

While these scanning systems include a moving head consisting of a small lens, they are not suitable for high speed scanning along very wide format for the following reasons:

1. They use linear sliding which is associated with vibrations, motions that may not be smooth, and may entail grinding of the linear slide along the scanning range.
2. They were designed for the field of wafer inspection. In this field the spatial resolution of the moving scanning head should be in the range of sub-micrometers and thus is not capable of scanning along a very wide scanning range since such a spatial resolution of the position of the head cannot be achieved along a wide scanning range.
3. They are much slower than is needed for scanning wide ranges.
4. They can not adjust and hold the high accelerations that occur when the wide scanning systems change the direction of the scan.
5. They can not balance the vibrations produced at very high speeds.
6. They do not work with a smooth motion.

ADVANTAGES

Accordingly, several advantages of some embodiments hereof are to provide a linear scanning system that can scan without linear sliding, that can scan very wide scanning formats, that scans at a very high resolution, that scans at very high speed, that has a smooth movement with the capability to hold high accelerations, and/or that can accommodate high accelerations and balance vibrations. Other advantages of various embodiments will become apparent from a consideration of the ensuing description and accompanying drawings.

SUMMARY

In several embodiments at least one rotatable plate is coupled to a carrying plate by at least one joint arm to cause the carrying plate to move back and forth along a linear path. The carrying plate is attached to a scanning head. In other embodiments a planetary system includes at least a first plate having a first axis of rotation and a second plate having a second axis of rotation. The second axis of rotation of the second plate is mounted on the first plate for causing a carrying plate mounted on the second plate to rotate around the first and second axes of rotation to produce a back and forth movement along a linear path. The carrying plate is attached to a scanning head.

In alternative embodiments a scanning system is provided for writing, printing, direct imaging, plotting, computed radiography, and scanning including an optical system containing at lest one modulatable radiation source for emitting radiation, a movable collimating lens, a reflector, and a focusing lens and a mechanical system containing a first mechanical carrier spinning about a first axis, second mechanical carrier spinning about a second axis, The second axis is mounted on the first mechanical carrier and is arranged to rotate about the first axis. A third mechanical carrier spins about a third axis, the third axis being mounted on the second mechanical carrier and arranged to rotate about the second axis, and a movable surface. The collimating lens is arranged to receive the radiation from the one radiation source and to produce at least one collimated beam propagating along an optical path from the collimating lens to the surface via the reflector and the focusing lens to project at least one focused radiation spot onto the surface. The mechanical system is arranged to cause the third mechanical carrier of the mechanical system to carry the reflector and the focusing lens of the optical system for moving the one focused radiation spot on the surface along a straight line.

Still other embodiments provide a scanning system for writing, printing, direct imaging, plotting, computed radiography, and scanning. They include an optical system containing at lest one modulatable radiation source for emitting radiation, a movable collimating lens, a plurality of reflectors, and a focusing lens and a mechanical system containing first mechanical carrier spinning about a first axis, second mechanical carrier spinning about second axis. The second axis is mounted on the first mechanical carrier and rotates about the first axis, and a movable surface. The collimating lens is arranged to receive the radiation from the one radiation source and to produce at least one collimated beam propagating along an optical path from the collimating lens to the surface via the plurality of reflectors. The focusing lens projects at least one focused radiation spot onto the surface. The first and second mechanical carriers are arranged to carry the plurality of reflectors, and the mechanical system is arranged to cause the second mechanical carrier of the mechanical system to carry the focusing lens of the optical system for moving the one focused radiation spot onto said surface along a straight line.

DRAWINGS

FIG. 3 illustrates a balanced linear scanning system including two scanning systems of FIG. 2a.

FIGS. 4a-4c are top views of different scanning positions of another linear scanning system including a carrying plate to be attached to a moving scanning head.

FIG. 4d is a schematic illustration of the moving scanning head attached to the carrying plate of FIGS. 4a-4c.

FIG. 4e shows a balanced linear scanning system including two scanning systems of FIG. 4a.

FIG. 7b illustrates the linear scanned path of the system of FIG. 7a.

FIG. 10f is a schematic side view cross-section of the scanning system illustrated by FIGS. 10a-10e.

FIG. 10g illustrates the moving scanning head of the scanning systems of FIGS. 10a-10f.

FIG. 10h is a three dimensional schematic illustration of the scanning system illustrated by FIGS. 10a-10g with the additional balancing weights.

Figure 13:
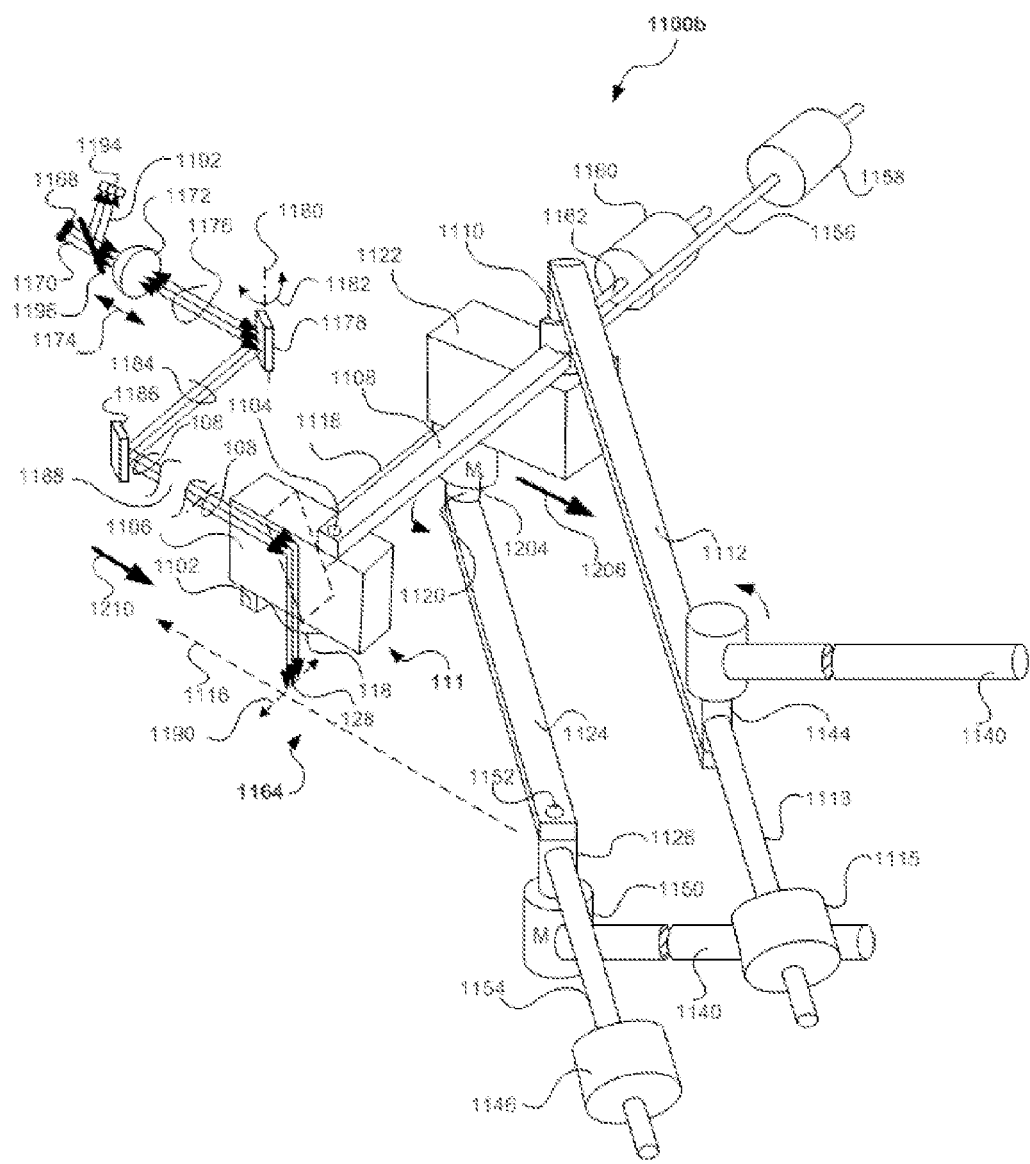
Figures 14, 15:
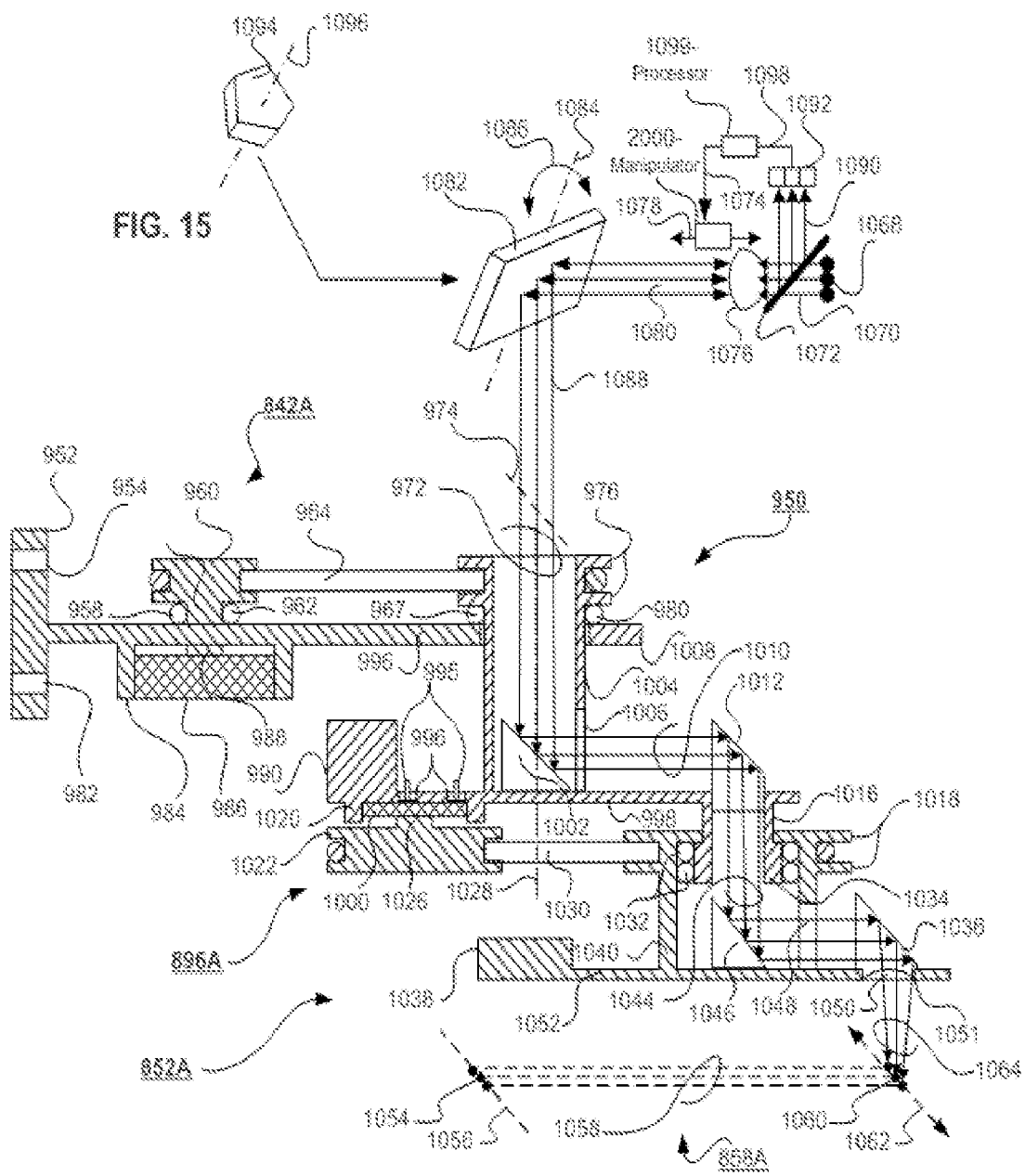

FIGS. 13 and 14 schematically illustrate scanning systems, according to the present application, including the combination of lateral moving scanning head, longitudinal scanning beams and relative longitudinal movement between the scanning head and the scanned surface.

FIG. 15 shows a scanning polygon that may replace the scanning mirror of the system illustrated by FIG. 14.

| ABBREVIATIONS AND SYMBOLS | |
|---|---|
| LCD—Liquid Crystal Displays | HDTV—High Definition Television |
| CW—Clockwise | CCW—Counter Clockwise |
| DPI—Dots Per Inch | MEMS—Micro Electro Mechanical |
| CR—Computed Radiography | System |

DETAILED DESCRIPTION OF EXEMPLARY EMBODIMENTS

Figure 1A:
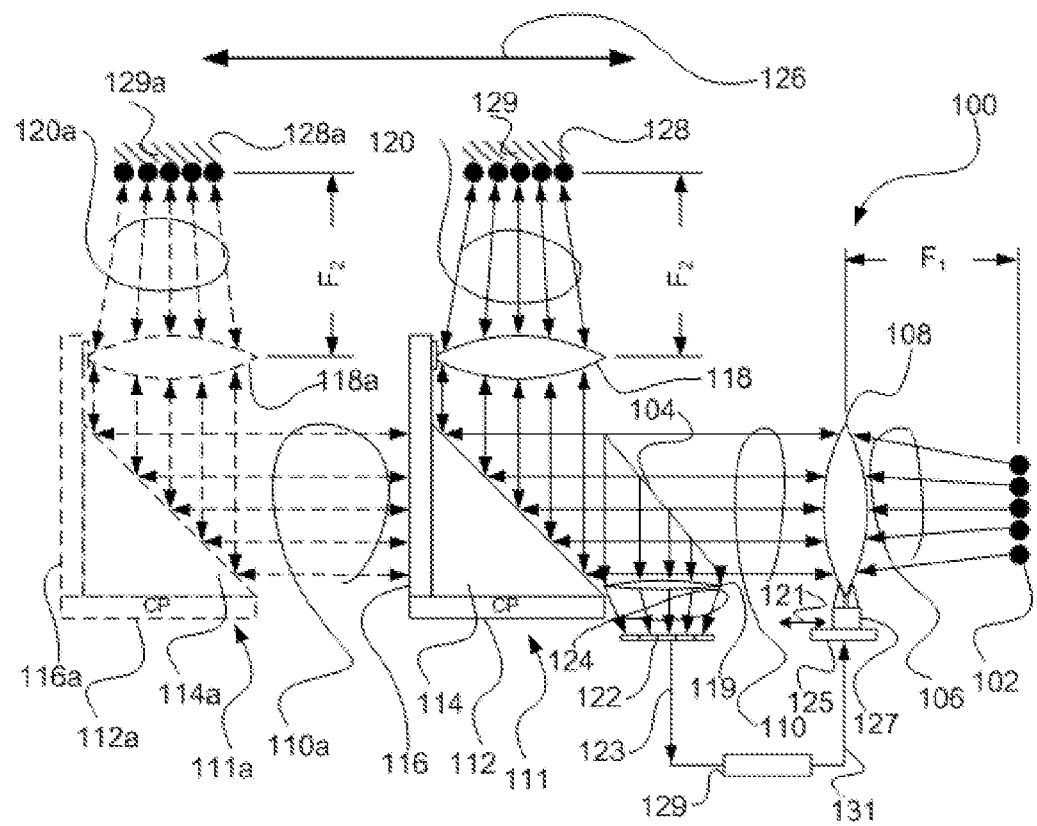
FIG. 1a is a schematic illustration of a linear scanning system including a moving optical head for receiving at least one collimated beam for projecting a focused radiation spot onto a scanned surface.

FIG. 1a is a schematic illustration of a high resolution linear scanning system for high scanning speed along a wide scanning format. Such a system may be used for very high resolution reading, inspecting, writing and printing (including direct imaging) in the field of LCDs, flat panels, HDTVs, plasma screens, and any other products fabricated to have a wide format.

The scanning system may include light sources that emit radiation in the spectrum between infra-red and ultra-violet. Such light sources are modulatable and are used for producing a written pattern on the surface that they scan. The intensities of the radiation sources depend upon the energy needed for detection and writing on radiation sensitive materials such as photo-resists.

The radiation sources and the detection system may be in a static position and may include an auto-focusing system. The moving scanning head receives collimated beams and thus maintains the same optical conditions along its optical path.

Optical Scanning Head—FIG. 1a

The scanning system of FIG. 1a includes a scanning head 111 movable in the directions of arrows 126. A plurality of radiation sources 102 that each may be modulated individually is located at the focal plan of lens 108, which has a focal length $F_1$. A plurality of beams 106 emitted by sources 102 is converted, by lens 108, into collimated beams 110. Collimated beams 110 pass through beam splitter 104 and are reflected by reflector 114 toward lens 118. Lens 118 focuses beams 110 into focused beams 120 that produce an array of focused radiation spots 128 projected onto the focal plane of lens 118. Radiation spots 128 are focused onto the focal plan of lens 118, which is located on surface 129 at a distance $F_2$ from lens 118. $F_2$ is the focal length of lens 118 and focal lengths $F_1$ and $F_2$ may be equal or different.

Reflector 114 may be of any type of reflector, such as a mirror, a prism, or a dielectric mirror. Lens 118 is mounted on a supporting plate 116 attached to a carrying plate 112. Reflector 114 is mounted on carrying plate 112 and is carried together with lens 118 on carrying plate 112 in the direction along arrows 126.

The radiation reflected back from radiation spots 128 is collected by lens 118 and converted into returning collimated beams 110 which later are reflected by reflector 114 toward beam splitter 104. Beam splitter 104 reflects returning beams 110 and directs them toward focusing lens 119 from which they are projected onto detector 122. Detector 122 detects beams 110 to acquire the image of the radiation provided by scanned surface 129.

When scanning head 111 moves into another scanning position to the left, it is shown as head 111a. Head 111a includes carrying plate 112a, supporting plate 116a, reflector 114a, and focusing lens 118a. In the new scanning position, beams 110 and returning beams 110 are illustrated by broken lines 110a that are focused by lens 118a into focused beams 120a to be projected onto the focal plan of lens 118a as an array of focused radiation spots 128a on surface 129.

Scanning head 111 moves parallel to collimated beams 110 in the horizontal direction (arrows 126). The focusing conditions of spots 128a and 128 are the same for any scan position of head 111. For the same reason, in spite of the fact that head 111 moves in the direction of arrows 126 while sources 102, lens 108, beam splitter 104, lens 119, and detectors 122 are in a static position, the focusing conditions of returning beams 110 or 110a on detector 122 are the same for any scan position of head 111.

The radiation energy of scanning radiation spots 128 on scanned surface 129 may be used for of reading, writing, printing, plotting, inspecting, and illuminating. Scanning spots 128 on surface 129 are reflected back and collected by lens 118 and are projected onto detector 122 via reflector 114 and beam splitter 104. Although the scanning systems may be described as being suitable either for writing or reading, they are also suitable for both of these applications simultaneously.

Auto-Focus System—FIG. 1a

The system of FIG. 1a may include an auto-focusing system. Detector 122 converts the optical signal that it receives into electronic signal that is fed, by electrical lead 123, into electronic processing unit 129. Processing unit 129 processes the signal received from lead 123 and determines what corrections are needed in the position of lens 108 in order to bring system 100 into optimal focusing According to the corrections needed, processing unit 129 produces electronic correction signal that is transmitted, as a control signal, by lead 131 to translation stage or platform 125. Stage 125 in turn, moves in the direction of arrows 121 into a new position, as instructed by processing unit 129. Stage 125 carries mounting arm 127 on which lens 108 is mounted and thus lens 108 moves together with stage 125 into a new focusing position along arrows 121 where the focusing conditions of system 100 are optimal.

Figure 1B:
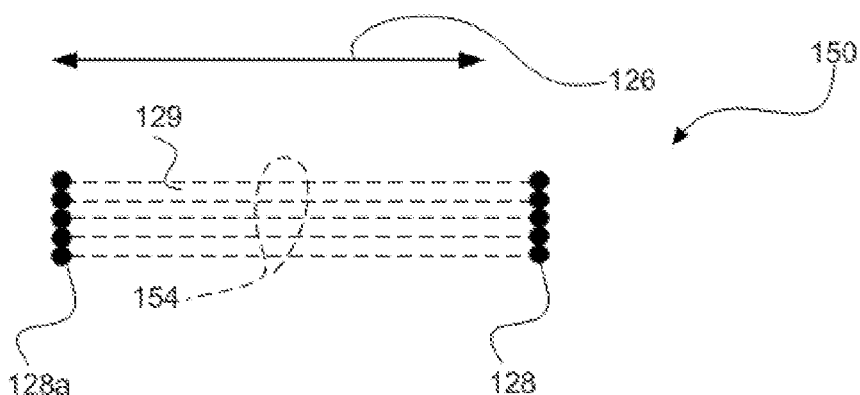
FIG. 1b is a schematic illustration of the linear scanned path that the system of FIG. 1a produces.

Straight Lines of Scanning Spots—FIG. 1b

FIG. 1b shows scanning paths 154 of spots 128 of FIG. 1a produced by the translation of scanning head 111 along arrows 126. The position of spots arrays 128 and 128a are controlled by the scanning positions (111 or 111a) of the scanning head, as illustrated in FIG. 1a.

Figure 2A:
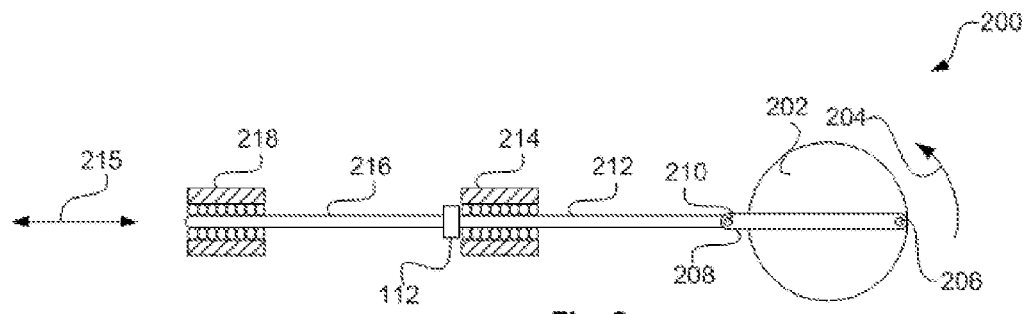
FIGS. 2a-2c are top and side views of different scanning positions of a linear scanning system including a carrying plate to be attached to a moving optical scanning head.
Figure 2B:
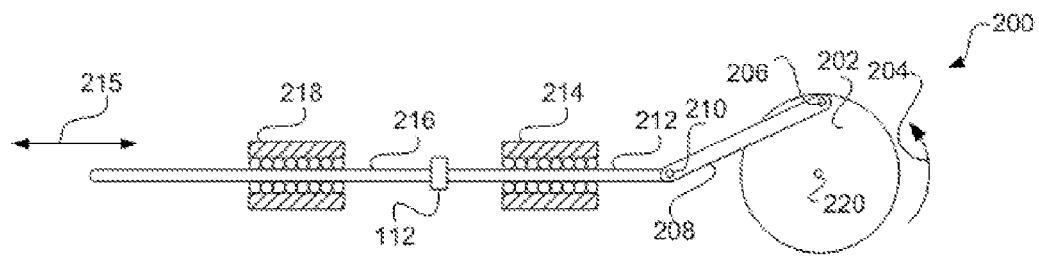
Figure 2C:
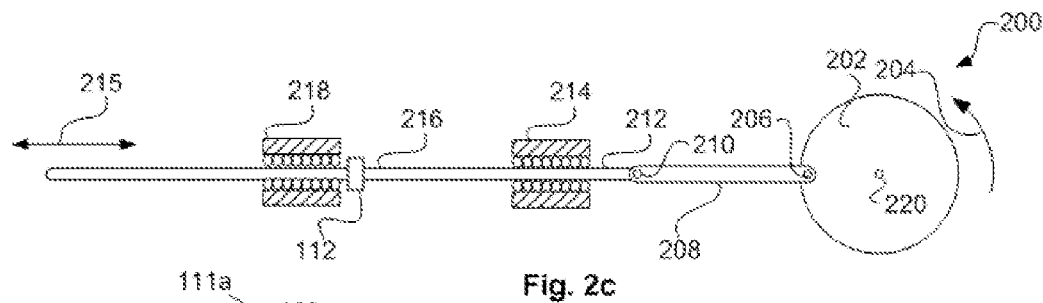

Scanning Systems with Sliding Mechanical Parts—FIGS. 2a-2c

Figure 2D:
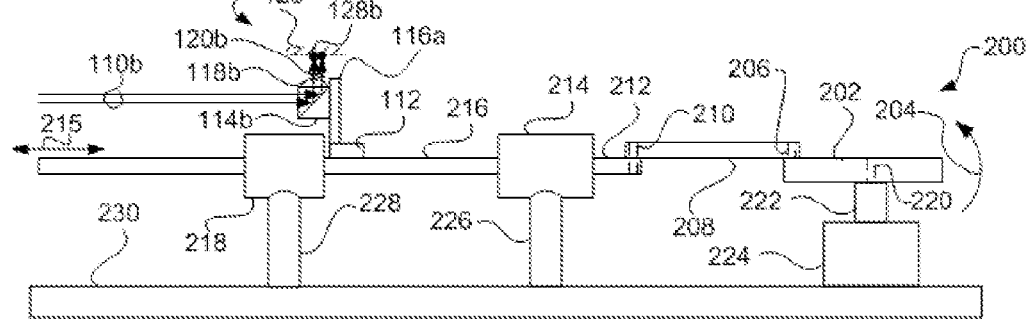

FIGS. 2a-2c are top views of a linear scanning system 200 in a different scanning position. FIG. 2d is a side view of the system 200.

The scanning system is designed to produce a wide scan. With the mechanical and optical precisions available today, it may produce an accurate scan with a spatial resolution of hundreds of Dots Per Inch (DPI). This high resolution is needed for writing, direct imaging, printing, reading, and inspecting in the fields noted. System 200 can maintain such high resolution across a wide scanning range, i.e., between a few centimeters and several meters. The system is capable of producing such large scanning amplitudes at a rate of thousands scans per minute with a resolution of several micrometers. When using two hundred beams that are similar to beams 110 of FIG. 1a, which are modulated individually, the scanning for direct imaging is in a rate of tens of meters per minute in the longitudinal direction and across a 1 m wide area with a resolution of a few micrometers.

FIG. 2a shows a rotating plate 202 that rotates Counter-Clockwise (CCW) in the direction of arrow 204 around its rotational axis 220 (shown in FIG. 2b). Linearly movable rod 216 is guided by linear bearings 218 and 214 that are illustrated in cross sections. While linear bearings 218 and 214 are shown as ball bearings, they may be of any other types as well, such as air slide bearings, ceramic bearings, magnetic bearings, and air-flow bearings.

Rotating plate 202 is coupled to side 212 of rod 216 by coupling arm 208. One side of coupling arm 208 is attached to rotating plate 202 at a rotational axis 206 and the other side of coupling arm 208 is attached, at a rotational axis 210, to section 212 of rod 216. When plate 202 rotates around its axis 220, it pushes and pulls coupling arm 208, which in turn causes rod 216 to move back and forth along a linear path that is determined by bearings 214 and 218. Thus carrying plate (mounting base) 112, mounted on rod 216, moves in a linear path back and forth between bearings 214 and 218 and along arrows 215.

Carrying plate 112 carries a scanning head (shown in FIG. 2d) similar to scanning head 111 of FIG. 1a. Similarly, arrows 215 of FIGS. 2a-2d are analogous to arrows 126 of FIG. 1a and show the directions along which optical scanning head 111 (or a similar scanning head) are moved by carrying plate 112.

The scanning system converts a constant angular motion of plate 202 into a linear movement of rod 216. Such a conversion assures a smooth linear motion of rod 216 with low accelerations in the reversal points of rod 216 when the scan direction of rod 216 is inverted. If plate 202 has an angular velocity $\omega$, its tangential velocity is $V=\omega R$. Tangential velocity V of plate 202 is transferred to the velocity v of rod 216 by the projection of velocity V along the linear movement of rod 216 given by equation (1):

$$V=\omega R \sin(\omega t) \qquad (1)$$

In this equation t is the rotation time of plate 202 and $\omega t$ is the angular angle of plate 202. At the scanning turning points of rod 216, $\omega t$ is equal to 0 or $\pi$ radians, which means that velocity v of rod 216 is zero as well. The velocity v is reduced gradually to zero at the turning points in a way that the motion of rod 216 is continues and smooth. The accelerations at the turning points are equal to $\omega^2 R$ which are the same as the radial acceleration of plate 202.

FIGS. 2a, 2b and 2c show scanning system 200 with the scanning position maximum to the right, in an intermediate position and maximum to the left, respectively.

FIG. 2d is a side view illustration of system 200 in the same scan position illustrated by FIG. 2c. FIG. 2d also illustrates an optical scanning head similar to scanning head 111a of FIG. 1a and carried by carrying plate 112. Thus scanning radiation spots 128b of FIG. 2d produces a linear scan on surface 129 that is similar to the scan illustrated by FIG. 1b.

The scanning principle of scanning head 111a of FIG. 2d is the same as the scanning principle of head 111a of FIG. 1a described.

Figure 3:
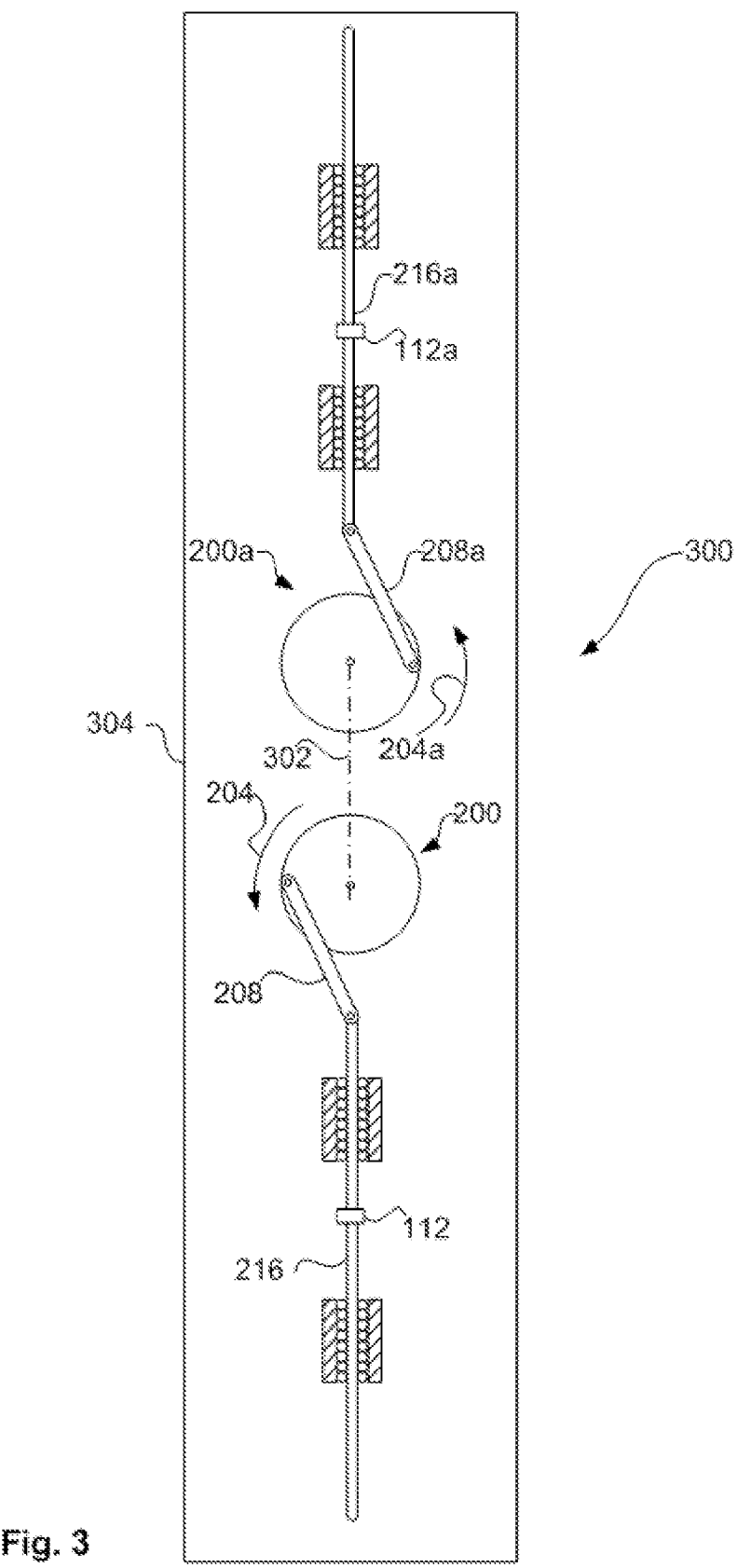

Balanced Scanning System—FIG. 3

FIG. 3 is a schematic top view illustration of a balanced scanning system including two scanning systems 200 and 200a, each of which is like the scanning system of FIGS. 2a-2d.

Scanning system 220a is rotated by 180 degrees with respect to system 200. Systems 200 and 200a are mounted on a common base plate 304. Rotating plates 202 and 202a of systems 200 and 200a rotate in the opposite directions along arrows 204 and 204a. Systems 200 and 200a and the movements of their parts are symmetric to each other with respect to a symmetry axis 302. Thus any forces, accelerations and vibrations of system 200 along the scanning path of carrying plate 112 mounted on rod 216 are cancelled by similar vibrations that system 200a introduces in the opposite direction along the movement of carrying plate 112a mounted on rod 216a. Similarly, the unbalanced forces that coupling arm 208 produces in system 200 are cancelled since system 200a introduces similar forces in the opposite direction through coupling arm 208a.

Thus the scanning system is balanced and causes carrying plate 112 to scan substantially without vibrations for carrying an optical scanning head like head 111 of FIG. 1a, thereby to producing an accurate and undisturbed optical scanning path like scanning path 154 of FIG. 1b.

Linear Scanning System with No Mechanical Sliding—FIGS. 4a-4c

FIGS. 4a-4c are schematic top views of different scanning positions of another scanning system 400 that converts a constant circular movement into a linear scan. Like scanning system 200 of FIGS. 2a-2c, system 400 of FIGS. 4a-4c has the advantage of a large scanning format with a scanning velocity that is gradually reduced to zero at the scan turning (reversal) points where the scan direction is inverted.

FIG. 4a shows linear scanning system 400 that includes plates 402 and 420 rotating around their axes 404 and 418 at the same angular velocity but in opposite directions, Clockwise (CW) and CCW along arrows 424 and 426, respectively. Joint arms 408, 428, and 414 are connected on one of their sides to rotating plates 402 and 420 by rotational axes 410 and 416, respectively. Joint arms 408, 428 and, 414 are connected on their other sides to joint arm 428 by rotational axes 406 and 412, respectively.

Carrying plate 112 is attached to joint arm 428 to carry optical scanning head 111 of FIG. 1a for producing a linear scan. The distance between axes 410 and 406 of joint arm 408 is equal to the distance between axes 416 and 412 of joint arm 414. Joint arm 428 is connected to arms 408 and 414 by axes 406 and 412, respectively, and is oriented in a direction parallel to line 422 passing through axes 404, 410, 416, and 418.

Since plates 402 and 426 rotate at the same angular velocity around their axes 404 and 418, respectively, but in opposite directions, joint arms 428 and 414 will always form the same angle with line 422. In addition, arms 408 and 414 are identical and the distance between axes 404 and 410 is equal to the distance between axes 416 and 418. Accordingly, for any rotational angel of plates 404 and 420 (any scan position of system 400), the distance between axis 410 to the point where arm 408 crosses line 422 will always be equal to the distance between axis 416 to the point where arm 414 crosses line 422. This means that for any scan position of system 400, rotational axes 410, 406, 412, and 416 are located at the corners of two equal sides of a trapezoid. Thus joint arm 428, as the small base of the trapezoid, is always parallel to line 422, which is the large base of the trapezoid. Carrying plate 112 is at the middle of the distance between axes 406 and 412 and thus is also at a middle point 409 of the distance between axes 404 and 418 of plates 402 and 420, respectively. During the scanning range, carrying plate 112 stays at middle point 409 between axes 404 and 418 all over the scanning range, while joint arm 428 maintains its orientation parallel to line 422. This means that carrying plate 112 performs a linear scan along line 407 passing through midpoint 409 on line 422 and is oriented normal to line 422.

FIGS. 4b and 4c illustrate two different scan positions of system 400. FIG. 4b shows scanning system 400 at a scan position where rotating plates 402 and 420 are rotated by additional 90 degrees with respect to the scan position illustrated by FIG. 4a. Similarly, FIG. 4c shows scanning system 400 at a scan position where rotating plates 402 and 420 are rotated by additional 90 degrees with respect to the scan position illustrated by FIG. 4b.

FIG. 4d shows optical scanning head 111 of FIG. 1a that is attached to carrying plate 112 of scanning system 400 of FIGS. 4a-4c to perform a linear scan along optical path 154 of FIG. 1b.

Advantages of Scanning Systems with No Sliding Mechanical Parts—FIGS. 4a-4c

Scanning system 400 has a major advantage over the scanning systems disclosed by the Karin et al. patent and published patent application since the linear scan of system 400 is produced completely by a combination of angular movements, without any mechanical linear sliding. Accordingly all the disadvantages of mechanical linear sliding associated with the Karin et al. patent systems, such as vibrations, motion that might not be smooth, and grinding of the linear slide along the scanning range, are substantially eliminated by scanning system 400.

Figure 4E:
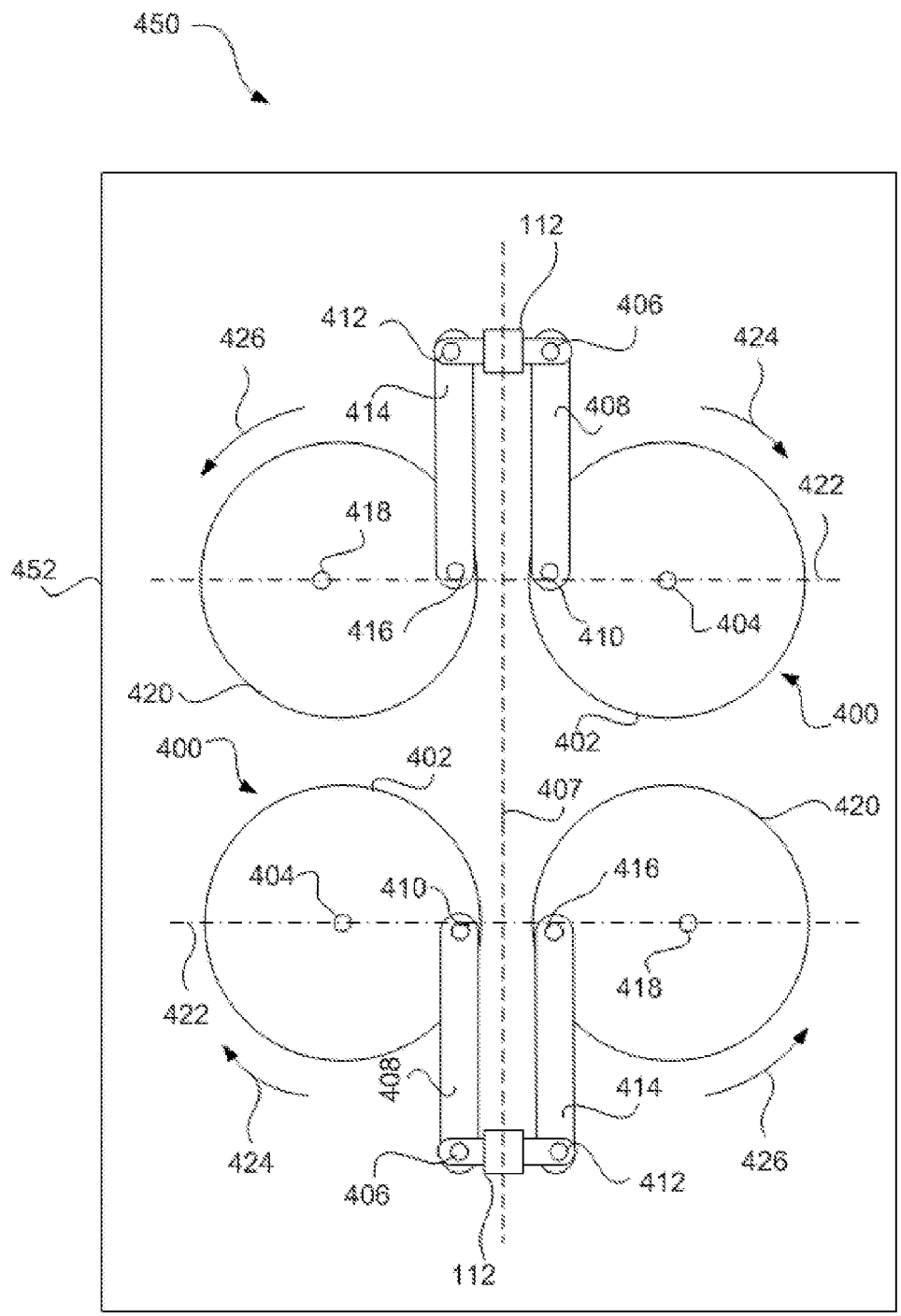

Balanced Scanning System—FIG. 4e

FIG. 4e is a schematic top view illustration of a balanced scanning system 450 including two scanning systems like scanning system 400 of FIGS. 4a-4d.

Scanning systems 400 of FIG. 4e are identical, but one of them is rotated by 180 degrees with respect to the other. Systems 400 are mounted on a common base plate 452. Rotating plates 402 and 420 of systems 400 rotate in the opposite directions. Systems 400 and the movements of their parts are symmetric to each other. Thus any forces, accelerations, and vibrations of one system along scanning path 407 of carrying plate 112 are cancelled by similar vibrations that the other system introduces in the opposite direction in the moving direction of carrying plate 112 along line 407.

In this case, scanning system 450 of FIG. 4e is balanced and scans carrying plate 112 substantially without vibrations for carrying optical scanning head 111 of FIG. 1a to produce an accurate and undisturbed optical scanning path, like scanning path 154 of FIG. 1b.

Figure 5A:
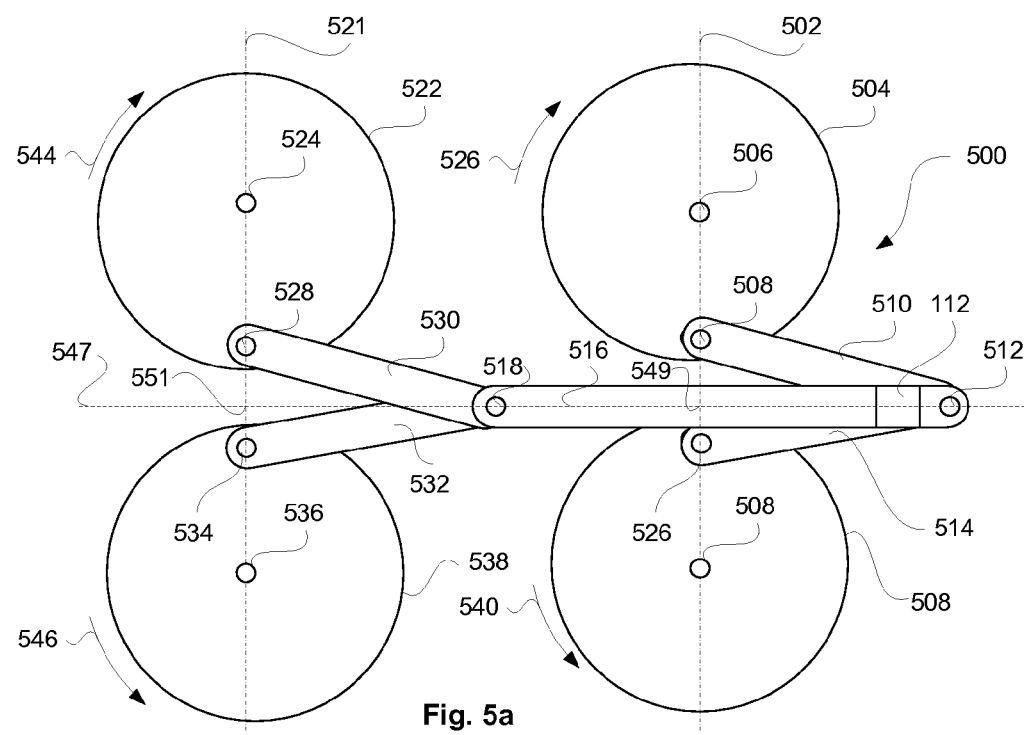
FIGS. 5a-5c are top views of different scanning positions of another linear scanning system including a carrying plate to be attached to a moving scanning head.
Figure 5B:
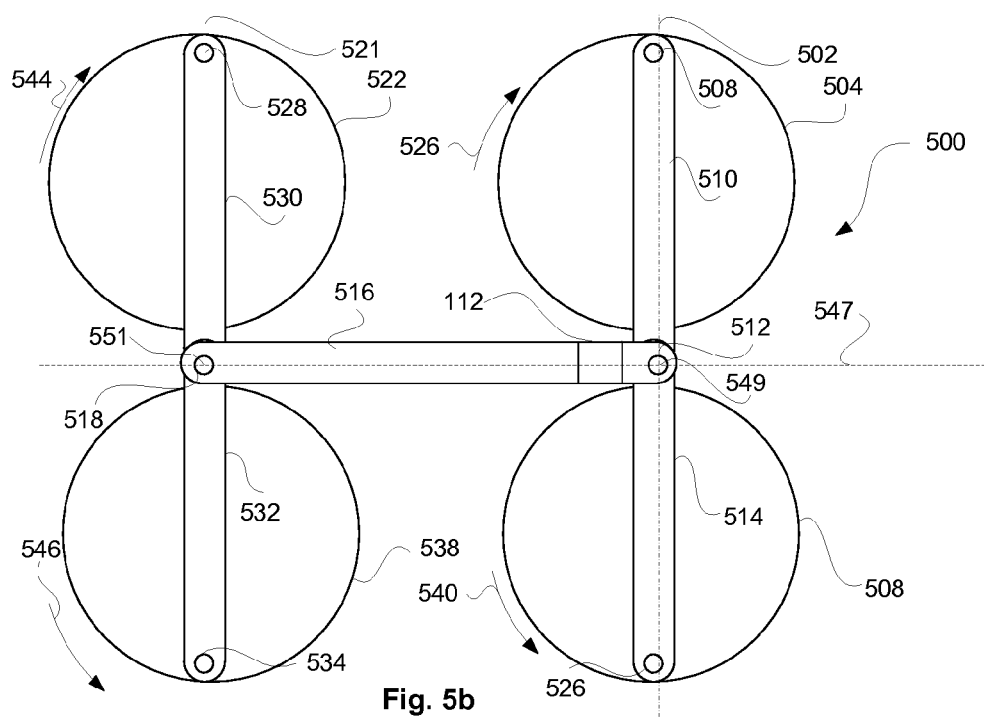
Figure 5C:
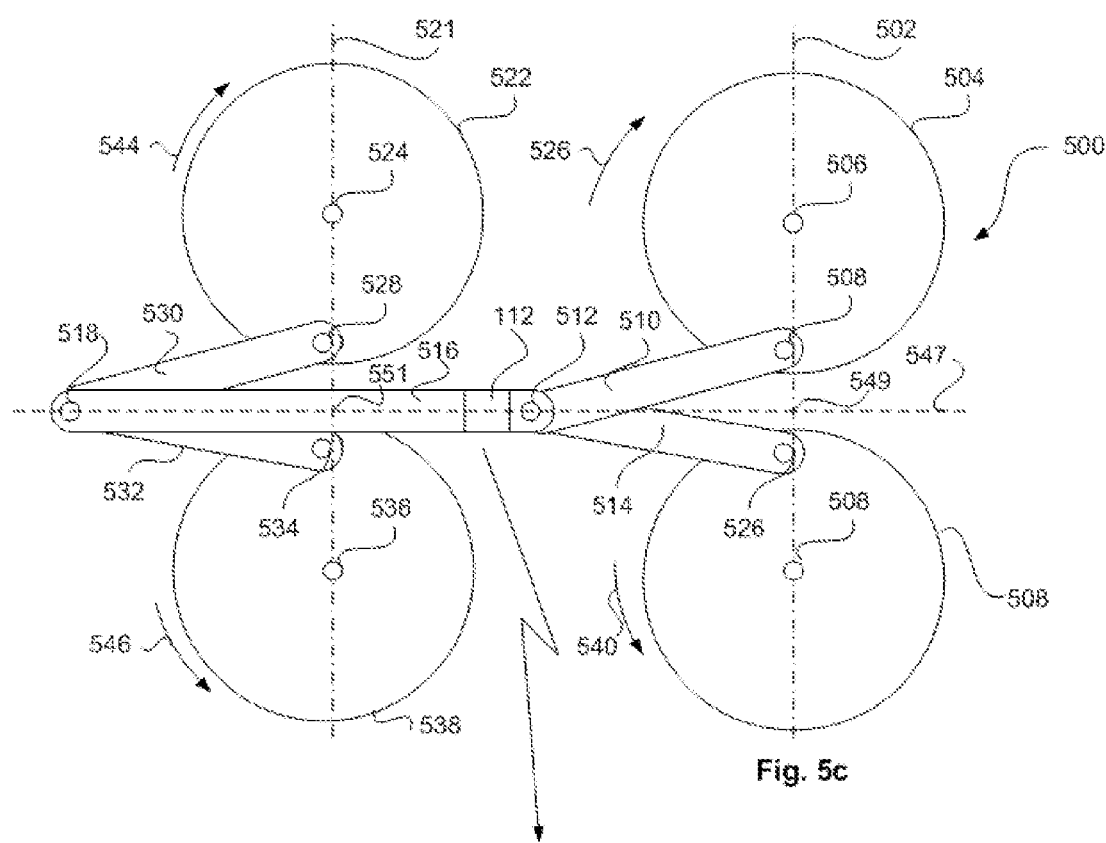

Another Scanning System with No Sliding Mechanical Parts—FIGS. 5a-5c

FIGS. 5a-5c are schematic illustrations of different scan positions of another linear scanning system 500. System 500 of FIGS. 5a-5c has the same advantage as system 400 of FIGS. 4a-4c, i.e., it performs a linear scan with substantially no mechanical linear sliding.

FIG. 5a is a top view of one scan position of system 500, including rotating plates 504 and 522 that rotate CW at equal speeds c around rotational axes 506 and 524 in the directions along arrows 526 and 544, respectively. Another set of rotating plates includes rotating plates 508 and 538 rotating CCW at the same sped ω around rotational axes 508 and 536 in the direction along arrows 540 and 546, respectively. Accordingly, plates 504, 522, 538 and 508 all rotate at the same speed ω but plates 504 and 544 rotate CW while plates 508 and 538 rotate CCW.

Joint arms 530 and 532 are connected, by rotational axes 528 and 534, to rotating plates 522 and 538, respectively. Similarly, joint arms 510 and 514 are connected, by rotational axes 508 and 526, to rotating plates 504 and 508, respectively. Joint arms 516, 530, and 532 are connected together by rotational axis 518. Similarly, joints arms 516, 510, and 514 are connected together by rotational axis 512.

The distances between axes 524 and 528, axes 536 and 534, axes 508 and 526, and axes 506 and 508 are all equal to the radii of rotation of axes 528, 534, 526, and 508 rotating around axes 524, 536, 508, and 506, respectively. The distance between axes 528 and 518 of arm 530 is equal to the distance between axes 534 and 518 of arm 532, which is equal to the distance between axes 526 and 512 of arm 514, which in turn equal to the distance between axes 508 and 512 of arm 510.

Rotational axes 524, 528, 534, and 536 are aligned along line 521 and rotational axes 506, 508, 526, and 508 are aligned along line 502, which is parallel to line 521. Rotational axes 512 and 518 are aligned along line 547, which is the vertical bisector of the intervals between axes 506 and 508 and 524 and 536 along lines 502 and 521, respectively. Points 549 and 551, through which line 547 passes, are also the midpoints of intervals (506, 508) and (524, 536), respectively.

Accordingly, rotational axes 508, 512, and 526 are located at the corners of an isosceles triangle with interval (508, 526) is its base. Similarly, axes 528, 534, and 518 are located at the corners of isosceles triangle with interval (528, 534) is its base and is parallel to base interval (508, 526). Bases (508, 526) and (528, 534) of triangles (508, 512, 526) and (528, 518, 534), respectively, are parallel to each other and to lines 502 and 521 for any scan position of system 500.

Accordingly axes 512 and 518 will always be located on bisector line 547 for any scan position of linear scanning system 500. This means that during the scanning of system 500, axes 512 and 518 move at equal speed and along line 547. Thus axes 512 and 518 have no relative movement between them and can be coupled by rigid coupling arm 516 to be moved along line 547 with no rotation. Carrying plate 112 of optical scanning head 111 of FIG. 1*a* is mounted on arm 516 and moves together with arm 516 along straight line 547 with no rotational movement.

FIGS. 5*b* and 5*c* illustrate additional two different scan position of linear scanning system 500. FIG. 5*b* shows scanning system 500 at an intermediate scan position between the scanned positions of system 500 illustrated by FIGS. 5*a* and 5*c*. FIGS. 5*a* and 5*c* shows system 500 in its maximum scan position to the right and to the left, respectively.

Figure 5D:
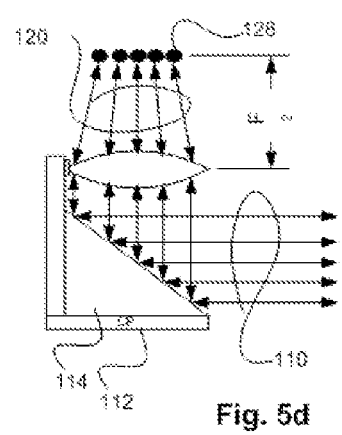
FIG. 5d is a schematic illustration of the moving scanning head attached to the carrying plate of FIGS. 4a-4c.

FIG. 5*d* shows optical scanning head 111 of FIG. 1*a* that is attached to carrying plate 112 of scanning system 500 of FIGS. 5*a*-5*c* for performing linear scan with optical path 154 of FIG. 1*b*.

A balanced linear scanning system can be constructed by mounting two systems 500 on a common base when one of them is rotated by 180 degrees with respect to the other in a way similar to the illustrated by FIGS. 3 and 4*e* for linear scanning systems 300 and 450, respectively. This is explained in the descriptions of FIGS. 3 and 4*e*.

Planetary Scanning System for Linear Scan—FIGS. 6*a*-6*h*

FIGS. 6*a-h* illustrates a planetary system 600 for scanning along a straight line without the need for any parts that use mechanical linear sliding. For a better understanding of the operational principle of system 600, it is shown in a top view in FIGS. 6*a*-6*h* with plates 606 and 602 shown as transparent.

System 600 includes rotating plates 606 and 602 rotating around axes 608 and 604, respectively. Rotational axis 608 of plate 606 is mounted on plate 602 and rotational axis 615 of rotating circle 616 is mounted on plate 606. Plate 602 and circle 616 rotate CW around their axes of rotation 604 and 615, respectively, in the direction of arrow 617. Plate 606 rotates CCW around axis 608 in a direction opposite to the rotation direction of plate 602 and circle 616. Since rotational axis 608 of plate 606 is mounted on plate 602 that rotates around its axis 604, then plate 606 spins about is axis 608 while also rotating around axis 604 of plate 602. Similarly, since rotational axis 615 of circle 616 is mounted on plate 606 that rotates around its axis 608, then circle 616 spins about is axis 615 while also rotating around axis 608 of plate 606.

The distance between axes 604 and 608 is equal to the distance between axes 608 and 615. Thus the rotational radius R of axis 608 around axis 604 is equal to the rotational radius R of axis 615 around axis 608. Plate 602 and circle 616 rotates CW with equal angular velocities ω, while plate 606 rotates CCW with angular velocity −2ω. In this case, the coordinates of the position of rotational axis 615 along X-axis and Y-axis relative to the initial position of axis 615 as illustrated by FIG. 6*a* are given by equations (2) and (3):

$$Y = -R \cdot \sin(\omega t) + R \cdot \sin(\overline{\omega} t) = 0 \quad (2)$$

$$X = 2R \cdot (1 - \cos(\omega t)) \quad (3)$$

Figure 6A:
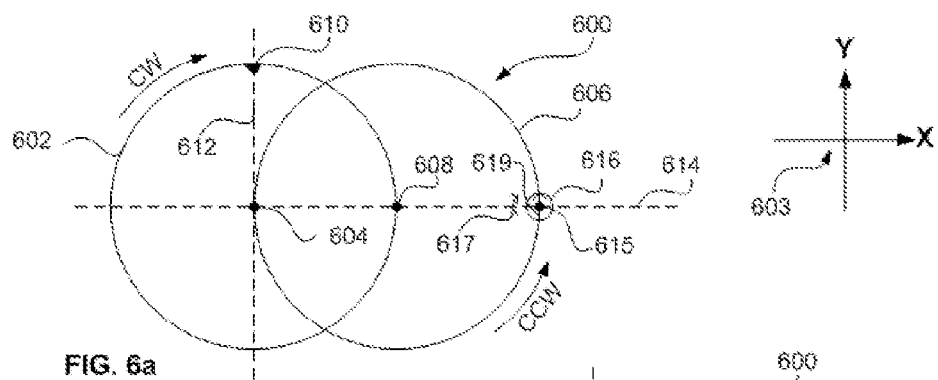
FIGS. 6a-6h illustrate the different scanning positions of a planetary scanning system that produces a linear scan.
Figure 6B:
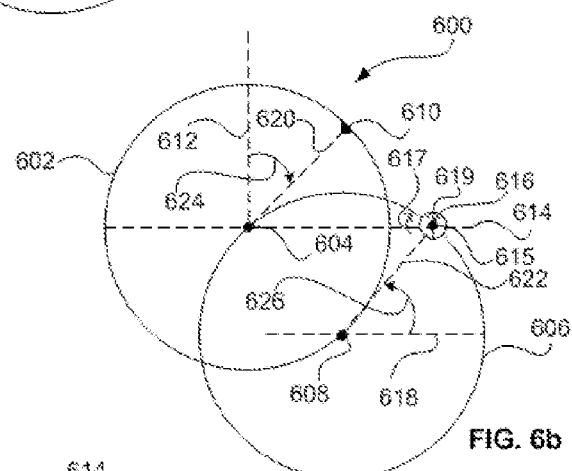
Figure 6C:
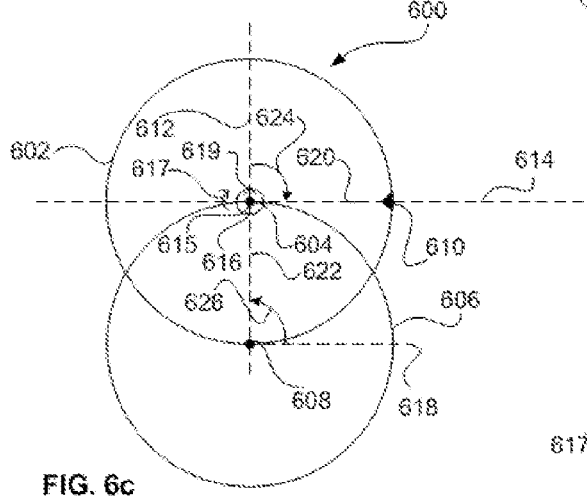
Figure 6D:
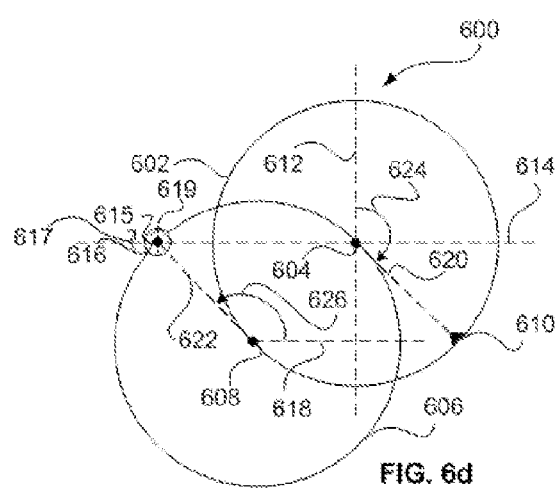

In these expressions, t is the time difference between any scan position of system 600 and the initial scan position of system 600 of FIG. 6*a* and ωt is the rotational angle between any scan position of system 600 and the initial scan position of system 600. Coordinates X and Y are shown by diagram 603 of FIG. 6*a*.

The rotational angles between the scan positions of system 600 and other scan positions of system 600 are illustrated by angles 624 and 626 of FIGS. 6*a*-6*h*. Angle 624 is measured between line 612, parallel to the Y-axis and line 620, which is the radius between axis 604 and mark 610. Point 610 on plate 602 is a mark used to measure angle 624 in FIGS. 6*b*-6*h*. Angle 626 is measured between line 618, parallel to the X-axis and line 622, which is the radius between axis 608 and axis 615.

The displacement of axis 615 along Y-axis is zero. Thus axis 615 moves only along the axis-X and along line 614. Since circle 616 rotates at the same angular velocity as plate 602 but, at the opposite direction as plate 606 on which its axis of rotation 615 is mounted, its orientation along arrow 619 remains unchanged.

Figure 6E:
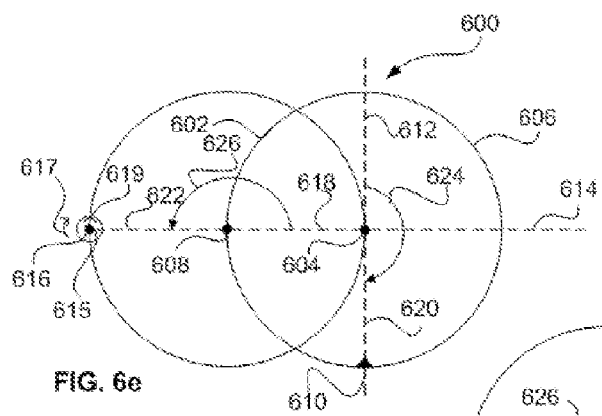
Figure 6F:
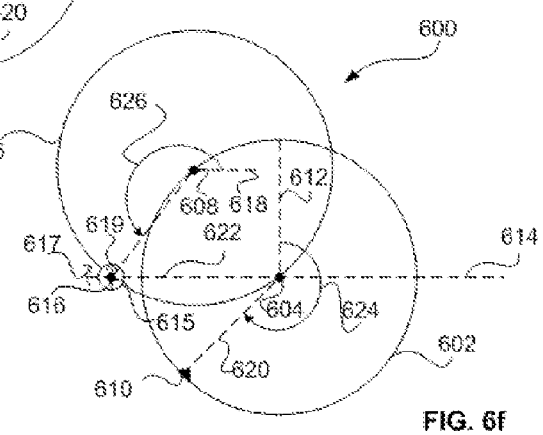
Figure 6G:
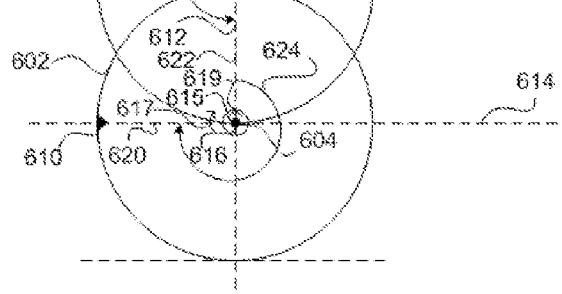
Figure 6H:
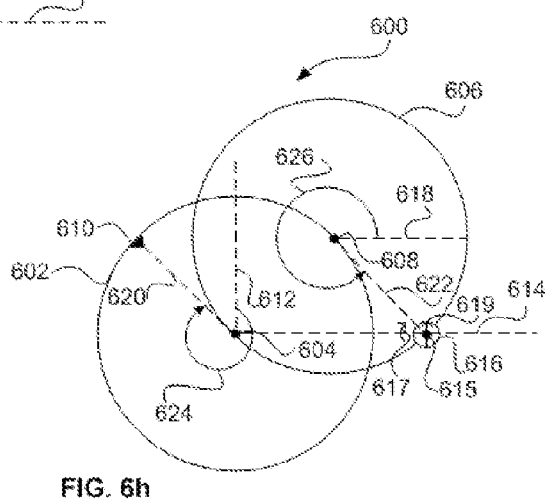

Accordingly, circle 616 moves along straight line 614 while maintaining its fixed orientation. The movement of circle 616 along line 614 and its fixed orientation (shown by the fixed orientation of arrow 619) are illustrated in FIGS. 6*a*-6*h*, at different scan positions (angles 624 and 626) that are changed from one figure to the next following figure by an angle increment of 45 degrees. FIGS. 6*a* and 6*e* illustrate the extreme scanning positions, to the right and to the left, of axes 615 of circle 616 along the X-axis, respectively.

Figure 7A:
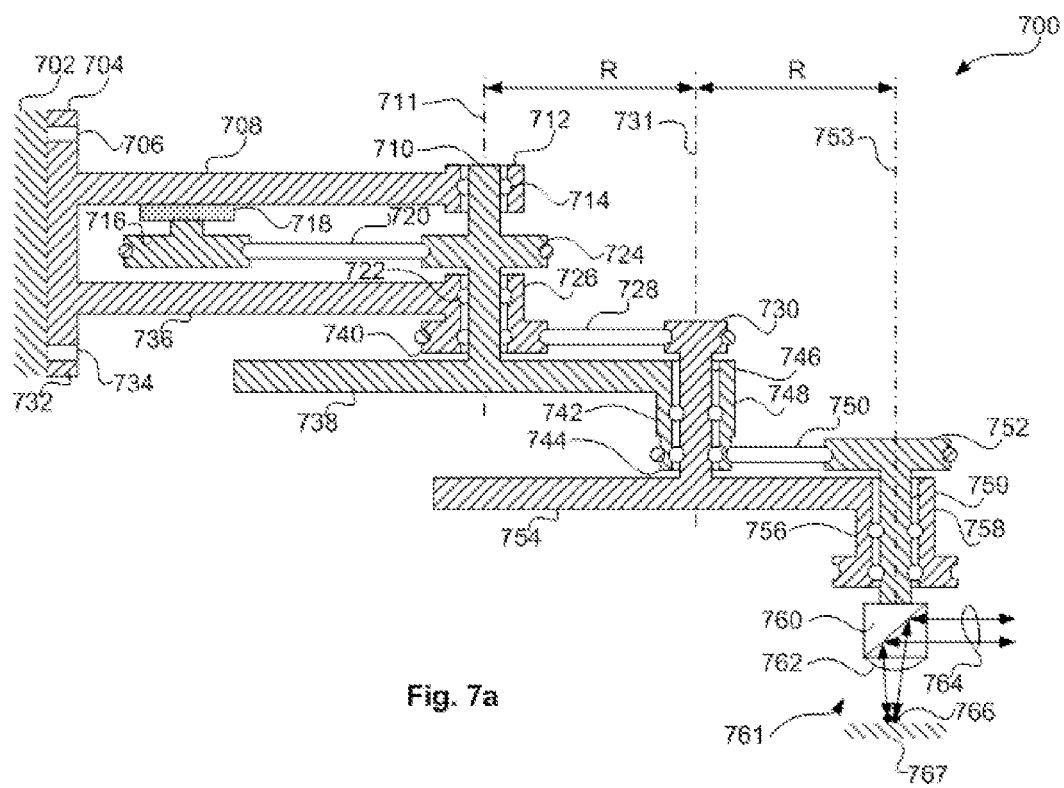
FIG. 7a is a schematic illustration of a side view cross-section of a planetary system similar to the system of FIG. 6a that produces a linear scan.
Figure 7B:
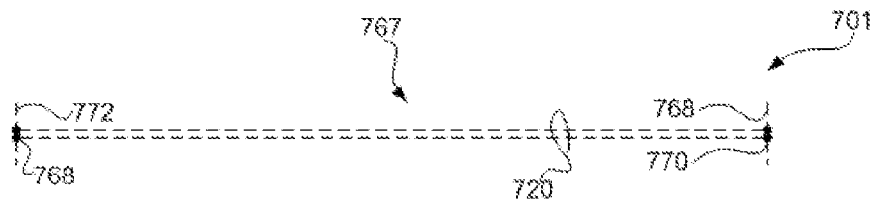

Alternative Planetary System for Linear Scan—FIGS. 7a-7b

FIG. 7a is a schematic side view illustration of a cross-section of linear scanning system 700. The operational principle of system 700 is based on planetary scanning system 600 of FIGS. 6a-6h. System 700 includes a propelling mechanism to rotate and spin all of its moving parts using a single motor. Planetary scanning system 700 produces an optical scan along straight lines without the need for any movement of mechanical linear sliding. The disadvantages associated with such linear sliding are explained.

Scanning system 700 includes a static portion 704 that is mounted by, mounting holes 706 and 734 in plate 732, to base 702. Plate 732 of static part 704 is attached to one side of arms 708 and 736. The other sides of arms 708 and 736 of static part 704 are attached to ball bearings 712 and 726, respectively. Ball bearings 712 and 726 have plurality of balls 714 and 722, respectively.

Rotating axis 710 of rotating plate 738 is attached to plate 738 and is the rotating part of bearings 714 and 726. Rotating axis 710 and plate 738 are analog to rotating axis 604 and plate 602 of FIG. 6a. Motor 718 is attached to arm 708 to rotate coupling wheel 716 in a CW direction. Rotational axis 710 includes coupling wheel 724 that is coupled, by coupling belt 720 to coupling wheel 716 of motor 718. Accordingly wheel 724 rotates CW, together with axis 710 and plate 738.

Ball bearing 748 has a plurality of balls 742 mounted on plate 738. Bearing 748 includes axis 746 that is attached to plate 754 and coupling wheel 730. The lower part of bearing 726 is in the shape of static coupling wheel 740. Coupling belt 728 connects wheels 740 to wheel 730. Wheel 730 rotates CW, together with plate 738, around static wheel 740 while it is coupled, by belt 728, to static wheel 740. Accordingly, coupling belt 728 forces wheel 730 to spin CCW. The size of the radii of wheels 730 and 740 are related by a ratio of 1:2, respectively. Thus wheel 730 spins CCW at double the angular velocity at which plate 738 rotates CW. Spinning wheel 730 drives axis 746 and plate 754 to rotate CCW at double the angular velocity that plate 738 rotates CW.

Ball bearing 758 has a plurality of balls 756 and is mounted on plate 754. Bearing 758 includes axis 752 and is attached to scanning head 761 and coupling wheel 752. The lower part of bearing 748 is in the shape of static coupling wheel 744. Coupling belt 750 connects wheel 744 to wheel 752. Wheel 752 rotates CCW, together with plate 754, around static wheel 744. It is coupled by belt 750 to wheel 744. Accordingly, coupling belt 750 forces wheel 752 to spin CW. The diameter of wheel 744 is half of the diameter of wheel 752. Thus wheel 752 spins CW at half of the angular velocity that plate 754 rotates CCW. Spinning wheel 752 drives axis 759 and scanning head 761 to rotate CW at the same angular velocity that plate 738 rotates CW and at half of the angular velocity that plate 754 rotates CCW. The distance between axes 711 and 731 is equal to the distance between axes 731 and 753 and both of these distances are equal to a radius R.

Plates 738, 754, and scanning head 761 rotate CW, CCW, and CW, respectively, around axes 710, 746, and 759 of system 700 of FIG. 7a. These are analogous to plates 602, 606, and circle 616 rotating CW, CCW, and CW around axis 604, 608, and 615 of system 600 of FIG. 6a, respectively. Accordingly, scanning head 761 of system 700, like circle 616 of system 600, moves along a straight line while maintaining a fixed orientation.

Optical scanning head 761 is similar to scanning head 111 of FIG. 1a. Head 761 receives, by cube reflector 660, a plurality of collimated beams 764 and reflects beams 764 toward attached lens 762. Lens 762 focuses beams 764 into an array of radiation spots projected onto scanned surface 767 and moves together with head 761, along straight lines.

FIG. 7b is a schematic illustration 701 of scanned straight tracks 720 produced by radiation spots 768 moving on scanned surface 767. The scanned range of spots 768 is between lines 770 and 772.

While bearings 712, 726, 748, and 758 are illustrated as being ball bearings, they may be of any type of bearing as noted in connection with FIG. 2. While system 700 is illustrated as being constructed with a coupling mechanism of coupling belts to drive its moving parts, it may also be constructed with another mechanism, such as gear box, to achieve similar movement of its driven parts.

Figure 8A:
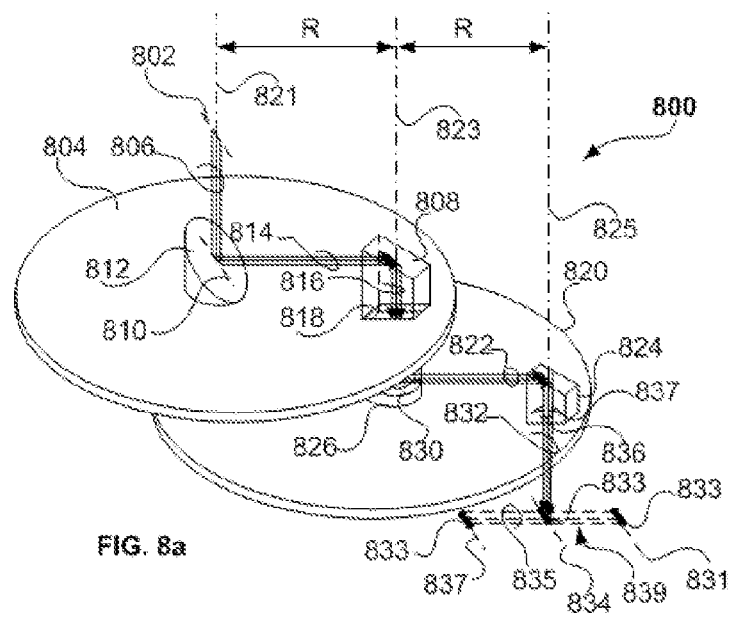
FIGS. 8a and 8b are schematic illustrations of three dimensional and side view cross-section of another planetary scanning system that produces a linear scan.

Another Planetary System for Linear Scan—FIG. 8a

FIG. 8a shows an alternative planetary system 800 for producing a linear scan along straight lines without the need for linearly sliding mechanical parts. The operational principle of system 800, like system 700 of FIG. 7a, is also based on planetary scanning system 600 of FIGS. 6a-6h. However, system 800 has a different optical system that achieves substantially, the scan of multiple beams along a straight line without the need to rotate circle 616 of system 600 or scanning head 761 of system 700.

System 800 includes rotating plates 804 and 820 rotating CW and CCW with angular velocities ω and 2ω around rotational axes 821 and 823 that are analogous to rotating plates 602 and 606 rotating CW and CCW with angular velocities ω and 2ω around axes 604 and 608 of FIG. 6a, respectively. The rotation mechanism for rotating plates 804 and 820 is not shown. The distance between axes 821 and 823 is equal to the distance between axis 823 and axis 825 and both of these distances are equal to R.

As explained for system 600 of FIG. 6a, the intersection point between axis 825 and plate 820 (analogous to axis 615 of system 600) moves along a straight line during the rotation of plates 804 and 820.

Reflector 812 is attached to rotating plate 804 and its tilted surface contains rotational axis 821. Reflector 808 is mounted on plate 804. Axis 823 passes through the center of reflector 808 at a distance R from axis 821. Plate 804 has opening 818 under part of reflector 808. Rotatable hollow tube 826 is mounted on plate 804 around opening 818 of plate 804 and is centered about axis 823. Hollow tube 826 is attached to plate 820 and rotates CCW together with plate 820. Hollow tube 826 includes a reflector (hidden by plate 804 and tube 826) that is mounted on plate 820. Tube 826 includes opening 830 directed toward reflector 824. Reflector 824 is attached to plate 820 above opening 836 that includes lens 837. Axis 825 passes through the center of reflector 824 and lens 837.

A plurality of collimated beams 806 are arranged with relative positions that are oriented along line 802. Beams 806 are launched toward reflector 812 when the central beam of beams 806 coincides with axis 821. Beams 806 hit reflector 812 along line 810 and are reflected as beams 814 toward reflector 808. Reflector 808 reflects beams 814, via opening 818 in plate 820, toward the hidden reflector mounted on plate 820 in hollow tube 826 where they are reflected, as beams 822, via opening 830 in tube 830, toward reflector 824 on plate 820. Reflector 808 reflects the central beam of beams 814 along axis 823. Reflector 824 receives beams 822 and reflects them, as beams 832, via opening 836 and lens 837, to be focused as radiation spots 833 having relative positions along line 834. The central beam of beams 832 is oriented along axis 825.

Since axis 825 is analogous to axis 615 of system 600 of FIG. 6a, the central beam of beams 832 and the central radiation spot of spots 833 is scanned by system 800 along a straight line.

Rotating plate 804 with its reflectors 812 and 808 is a sub-scanning system of system 800. Similarly rotating plate 820 with its reflectors (the hidden one) and reflector 824 is a sub-scanning system of system 800. Each of these sub systems is similar to the scanning system disclosed by FIGS. 20, 29a, and 30 of my U.S. Pat. No. 6,466,352, Oct. 15, 2002, titled "High-resolution reading and writing scan system for planar and cylindrical surfaces". This patent shows and explains why the relative orientation between the optical beams in scanning systems, such as the mentioned sub-scanning system, is preserved.

An alternative explanation to the preservation of the relative positions between beams 806 and beams 832 (or spots 833) is provided by the fact that each of the sub-scanning systems above is actually a rotating periscope. It is known that a periscope preserves the relative positions between the beams that it receives and the beams that it reflects. System 800 combines two rotating periscopes in a series (the configuration of a planetary system) and also preserves the relative positions between the beams that it receives (beams 806) and the beam that it reflects (beams 832 or spots 833).

Accordingly, the relative position in which beams 806 are arranged along line 802 is preserved in beams 814 reflected from reflector 808 toward the hidden reflector on plate 820. In the same way, the relative position in which beams 814 are arranged is preserved in beams 832 reflected from reflector 824 toward line 834 on scanned surface 839. That means that, for any scan position of system 800, the relative position of beams 806 is preserved by scanning radiation spots 833, which are projected, by scanning system 800 onto scanned surface 839 and along line 831. Thus, for any scan position of system 800, line 831 along which scanning spots 833 are arranged is oriented parallel to line 802.

As mentioned, the central spot of spots 833 is scanned along a straight line while all the other spots of spots 833 preserve their relative orientation with respect to each other (including the central spot). This means that all the spots of spots 833 are scanned along straight lines 835 over scanned surface 839.

Lines 831, 834 and 837 are all parallel and show the preserved orientation of scanning radiation spots 833 moving along straight scanned lines 835 and are illustrated at different scan positions of system 800.

Figure 8B:
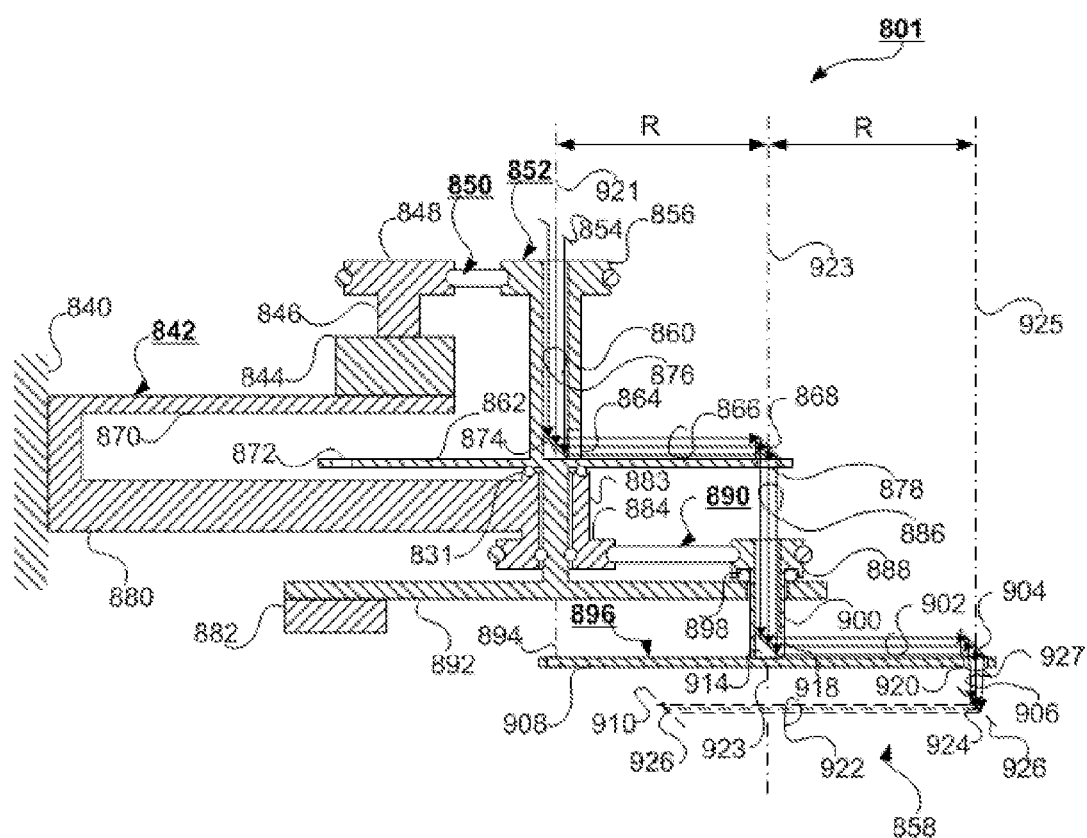

Side Cross-Section of Planetary Scanning System—FIG. 8b

FIG. 8b is a side view of a cross-section of a scanning system 801, which is similar to scanning system 800. System 801 includes the driving means needed to propel the moving part of scanning system 801, which are not shown in system 800 of FIG. 8a. FIG. 8b illustrates a cross-section of system 801 to expose the hidden parts that are not illustrated by FIG. 8a of system 800 to clarify the drawing and enable the full understanding of the principle of operation of scanning systems 800 and 801.

The operational principle of system 801, illustrated in FIG. 8b, is based on planetary scanning system 600 of FIGS. 6a-6h and system 800 of FIG. 8a. System 801 includes a propelling mechanism to rotate and spin all the moving parts of system 801 using a single motor. Planetary scanning system 801 produces an optical scan along straight lines without the need for any linear sliding movement, which has the disadvantages explained.

Scanning system 801 includes static portion 842 that is attached to base 840. Arm 880 of static portion 842 is attached to ball bearings 883. Ball bearing 883 has plurality of balls 831.

System 801 has a first rotating portion 852 that includes rotating axis 860 of rotating plate 892. Axis 860, in the form of a hollow tube, is attached to plates 862 and 892 and is the rotating part of bearings 883. The lower part of bearing 833 is in a shape of static coupling wheel 884. Rotating axis 860 and plate 892 are analogous to rotating axis 604 and plate 602 of FIG. 6a. Motor 844 is attached to arm 870 of static portion 842 so it rotates, by axis 846, coupling wheel 848 in a CW direction. Tube 860 is attached to rotating plates 862 and 892 and coupling wheel 856 is coupled, by coupling belt 850 to coupling wheel 848 of motor 844. Coupling wheels 848 and 856 have the same diameter. Accordingly wheel 856 rotates CW together with axis (tube) 860 and plates 862 and 892 when all of them have the same angular velocity.

A second rotating portion 896 of system 801 includes a coupling wheel 888 that has plurality of balls 898 mounted on plate 892 to act as a ball bearing as well. Coupling wheel 888 includes axis 900 in the form of a tube and is attached to plate 908 and coupling wheel 888, which are all part of second rotating portion 896. Coupling belt 890 connects wheel 888 to wheel 884. Wheel 888 rotates CW together with plate 892 around static wheel 884 while it is coupled, by belt 890, to wheel 884.

Accordingly, coupling belt 890 forces wheel 888 to spin CCW. Wheel 888 has a diameter that is half of the diameter of wheel 884. Thus, wheel 888 spins CCW at twice the angular velocity that plate 892 rotates CW. Spinning wheel 888 drives axis (tube) 900 and plate 908 to rotate CCW at twice the angular velocity that plates 892 and 862 rotate CW. Tubes 860 and 900 rotates around axes 921 and 923, respectively. Reflector 904 includes lens 927 and is mounted on plate 908 above opening 920 in plate 908. Axis 925 passes through the centers of reflector 904 and lens 927. The distance between axes 921 and 923 is equal to the distance between axes 921 and 925 and both of these distances are equal to a radius R.

Plates 892 and 908 rotate CW and CCW around axis 860 (or 921) and 900 (or 925) of system 801 of FIG. 8b and are analogous to plates 602 and 606 rotating CW and CCW around axis 604 and 608 of system 600 of FIG. 6a, respectively. Axis 925 of system 801 of FIG. 8b is analogous to axis 615 of system 600 of FIG. 6a. Accordingly, axis 925 of system 801, like axis 615 of system 600, moves along a straight line.

A plurality of collimated beams 876 are arranged with relative positions along line 854 and are launched toward reflector 874 with an orientation parallel to axis 921. Reflector 874 is attached to plate 862 and rotates with this plate. Reflector 874 reflects beams 876 as beams 866, via opening 864 in tube 860, toward reflector 868. Reflector 868 is mounted on plates 862 above opening 878 in plate 862 and rotates with this plate to reflect beams 866, via opening 878, as beams 886 directed toward reflector 914. Reflector 914 is mounted on plate 908 and rotates with this plate to reflect beams 887, via opening 918 in tube 900, as beams 902 toward reflector 904. Reflector 904 is attached to lens 927 and is mounted on plate 908 above opening 920 in plate 908. Reflector 904 and lens 927 rotate together with plate 908 to project beams 902 as focusing beams 906 toward surface 858 where beams 906 are focused into radiation spots 924 and are projected onto surface 858 to be arranged with relative position along line 926.

A plurality of collimated beams 876 are arranged with relative positions between them and are oriented along line 854. Beams 876 are launched toward reflector 874 when the central beam of beams 876 coincides with axis 921. Thus the same central beam is reflected as the central beam of beams 906 oriented along line 925 and produces central spot of spots 924 on surface 858 that axis 925 passes through it.

Thus, as mentioned, the central spot of spots 924 is scanned along a straight line while all the other spots of spots 924 preserves their relative orientation with respect to each other (including the central spot). This means that all the spots of spots 924 are scanned along straight lines 922 over scanned surface 858.

As mentioned, for system 800, the orientation of the relative position of beams 876 launched into system 801 is preserved, for any scan position of system 801, in beams 906 and spots 924 projected out off system 801. This means that lines 854, 926 and 910 are all parallel and show the preserved orientation of scanning radiation spots 924 moving along straight scanned lines 922 and are illustrated at different scan position of system 801.

To avoid vibrations of system 801 due to its rotating portions 852 and 896, opening 872 in rotating plate 862 balances opening or hole 878 in the other side of plate 862. This assures that the center of gravity of plate 862 is located on rotational axis 921. Similarly, opening 894 in rotating plate 908 balances hole 920 in the other side of plate 908 to assure that the center of gravity of plate 908 is located on rotational axis 923. For a similar purpose, weight 882 on plate 892 balances rotating portion 896 mounted on the other side of plate 892 to assure that the center of gravity of plate 892 is located on rotational axis 921.

Figure 8C:
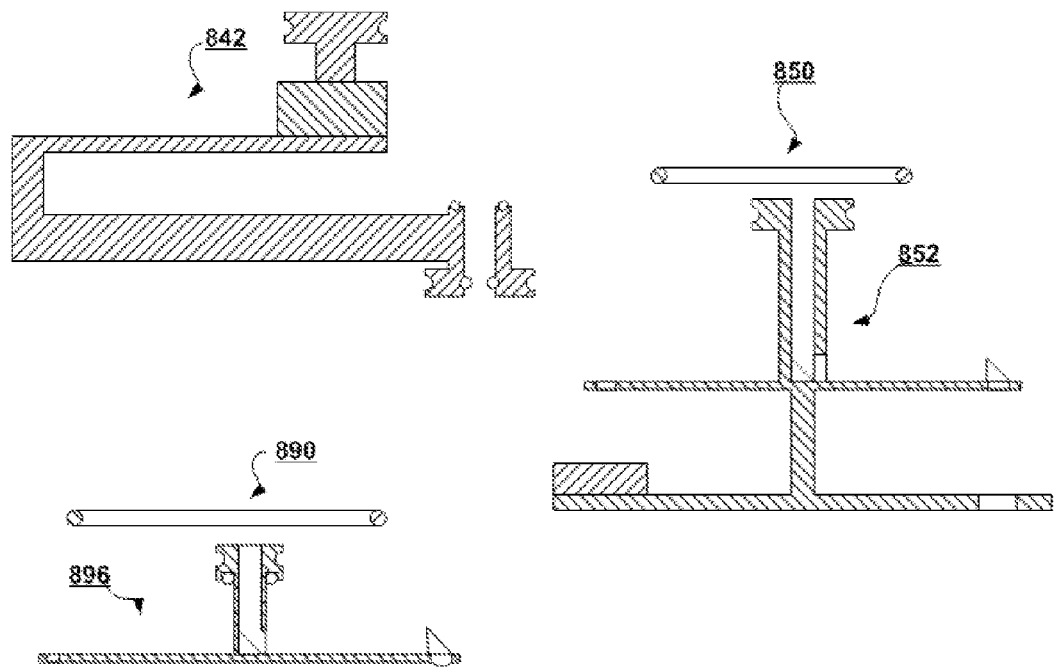
FIG. 8c illustrates the assembly parts of the scanning system of FIGS. 8a and 8b.

Assembly Parts of Planetary Scanning System for Linear Scan—FIG. 8c

To facilitate the understanding of the structure of system 801, FIG. 8c illustrates the assembly parts of system 801 in an unassembled position. FIG. 8c illustrates static portion 842, first rotating portion 852, second rotating portion 896 and coupling belts 850 and 890 of system 801 of FIG. 8b.

Figure 8D:
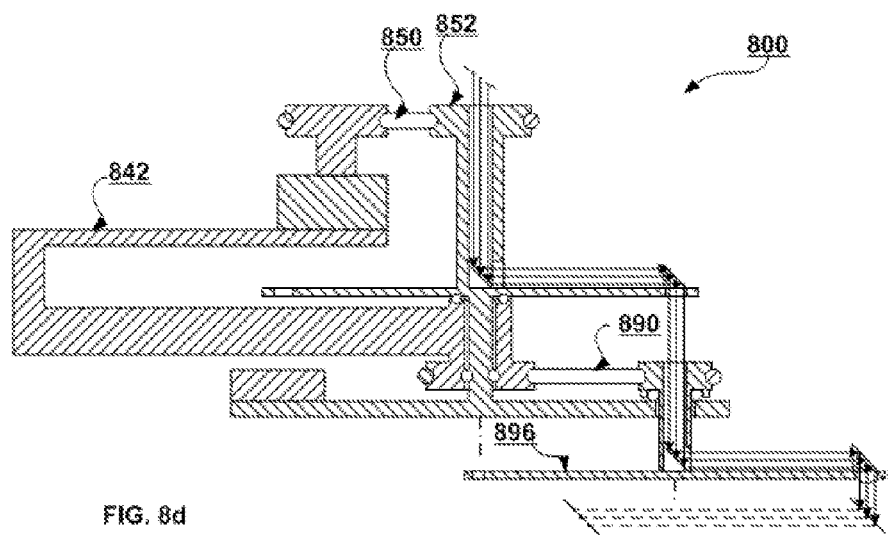
FIG. 8d shows the system of FIGS. 8a and 8b when the parts of FIG. 8c are assembled.

For the same purpose, FIG. 8d illustrates system 801 of FIG. 8b with most of the reference numerals are removed for clarity. The only the reference numerals shown are for static portion 842, first rotating portion 852, second rotating portion 896, and coupling belts 850 and 890 of system 801 of FIGS. 8b and 8c.

Figure 9:
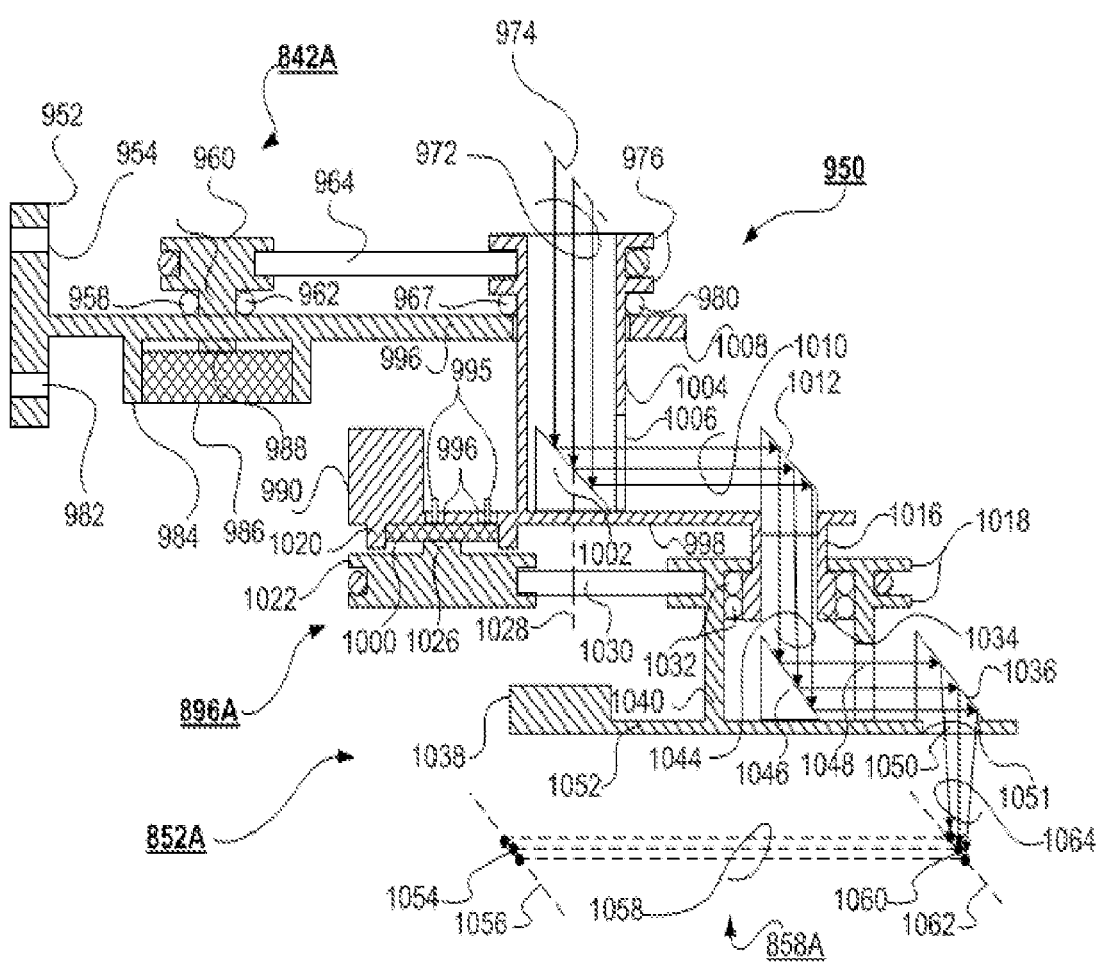
FIG. 9 illustrates a schematic side-view cross-section of another planetary scanning system that produces a linear scan.

Planetary Scanning System with Alternative Driving Mechanism—FIG. 9

FIG. 9 illustrates a linear scanning system 950 similar to scanning 800 of FIGS. 8a-8d with the exception that the second rotating portion 852A of system 950 is driven by an additional motor 1000.

Static portion 842A of system 950 includes mounting a plate 952 which has mounting holes 954 and 982, a motor housing 984, a motor 986 having an axis 988, a coupling wheel 960, balls 958 and 962, a supporting arm 996, and a ball bearing 1008 having balls 980 and 967.

First rotating portion 896A of system 950 includes a tube 1004 having an opening 1006, a coupling wheel 976, a reflector 1002, a rotating plate 998, a weight 990 a motor housing 1020, a motor axis 1026, a coupling wheel 1022, feed-throughs 996, slip rings 995, a reflector 1012, a tube 1016, and a bearing 1034 having balls 1032.

Static portion 842A, first rotating portion 896A, the optical setup of system 950, and the principle of operation are all similar to that of static portion 842, first rotating portion 896, the optical setup of system 800, (FIG. 8a) and their principle of operation, including mechanical coupling by belt 964. Accordingly, the description for these portions will not be repeated and only the differences between system 800 of FIGS. 8a-8d and system 950 of FIG. 9 will be described.

The second rotating portion of system 950 includes a cylinder 1040 mounted on bearing 1034 of first rotating portion 896A. The upper part of cylinder 1040 is in a shape of a coupling wheel 1018. The lower part of cylinder 1040 is attached to a rotating plate 1052. Plate 1052 has an opening 1048 and carries reflectors 1046 and 1036. Reflector 1036 is mounted on plate 1052 above opening 1051 and is attached to lens 1050.

Motor 988 of static portion 842A rotates first rotating portion 896A in the CW direction. Thus, as explained for scanning systems 600, 700, and 800 of FIGS. 6a, 7a, and 8a, second rotating portion 852A should be rotated in the CCW direction at double the rotational speed of first rotating portion 896A. Accordingly, coupling wheel 1022 of motor 1000 drives coupling wheel 1018, to which it is coupled by coupling belt 1030, in the CCW direction and at the required rotational speed. When coupling wheel 1018 rotates CCW, tube 1040, plate 1052, reflectors 1046 and 1036, lens 1050, and weight 1038 all move together at the same angular velocity with wheel 1018.

As explained, to perform a linear scan of surface 858A, motors 988 and 1000 drive first and second rotating portions 896A and 852A of system 900 CW and CCW with rotational velocities that are related by the ratio of 1:2, respectively. Motor 1000 is electrically connected, via feed-throughs 996, to slip rings 995. Slip rings 995 are in electrical contact with electrical leads (not shown) that receive electrical power from a power supply (not shown) to drive motor 1000.

The optical part of system 950 uses collimated beams 972 arranged along line 974 and oriented along axis 1028. Beams 972 pass multiple reflections and propagate as beams 1010, 1044 and 1064 via reflectors 1002, 1012, 1046, 1036 and lens 1056. These are then projected onto scanned surface 858A as radiation scan spots 1060 arranged along line 1062. Spots 1062 on surface 858A are also shown at a different scan position on surface 858A as spots 1054 arranged along line 1056.

As explained for scanning systems 600, 700, and 800 of FIGS. 6a, 7a and 8a, lines 974, 1062 and 1056 are parallel and scan tracks 1058, along which spots 1060 scan surface 858A, are straight lines.

Scanning system 950 has the following advantages:
1. It scans along multiple straight lines.
2. It includes only two rotating portions.
3. It has only one propelling unit.
4. It does not include mechanical linear sliders.

Parallelogram Scanning System for Linear Scan—FIGS. 10a-10f

FIGS. 10a-10e are top views of linear scanning system 1100 shown in different scan positions. To facilitate understanding of the structure of system 1100, FIG. 10f shows system 1100a, which is similar to system 1100, in a side cross-section.

System 1100 of FIGS. 10a-10e is another type of planetary system that includes two parallelograms. As clearly illustrated by FIG. 10b, first parallelogram (1114, 1110, 1120, 126) spins CCW around its two axes 1114 and 126 while the two axes 1110 and 1120 of second parallelogram (1110, 120, 1102,1104) are mounted on the first spinning (rotating) parallelogram (1114, 1110, 1120, 126) when the second parallelogram (1110, 120, 1102, 1104) rotates CW around rotational axes 1110 and 1120 of the first parallelogram (1114, 1110, 1120, 126).

Like systems 400, 500, 600, 700, 800, and 950 of respective FIGS. 4*a*, 5*a*, 6*a*, 7*a*, 8*a* and 9*a*, system 1100 does not include any mechanical linear sliding, thereby substantially eliminating its disadvantages.

Figure 10A:
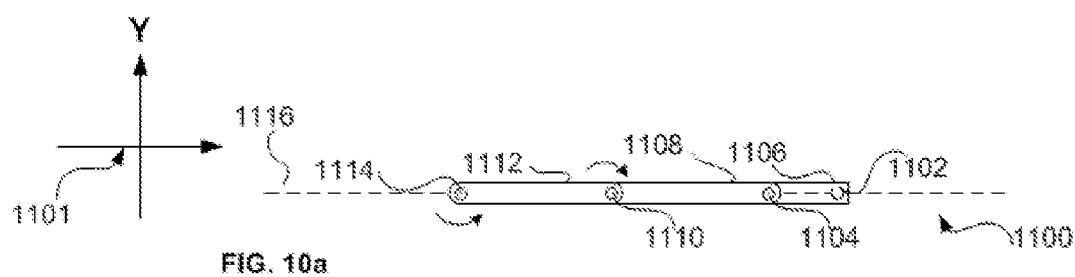
FIGS. 10a-10e are schematic top view illustrations of the different scan positions of a parallelogram scanning system.

FIG. 10*a* shows axis 1114 of arm 112, this arm is joined, by axis 1110, to arm 1108. Arm 1108 is joined, by axis 1104, to scanning transparent block 1106. Block 1106 is connected to an additional hidden axis 1102 and is positioned on scan line 1116, along which it is also aligned. The maximum scan position is to the right of system 1100, as illustrated.

Figure 10B:
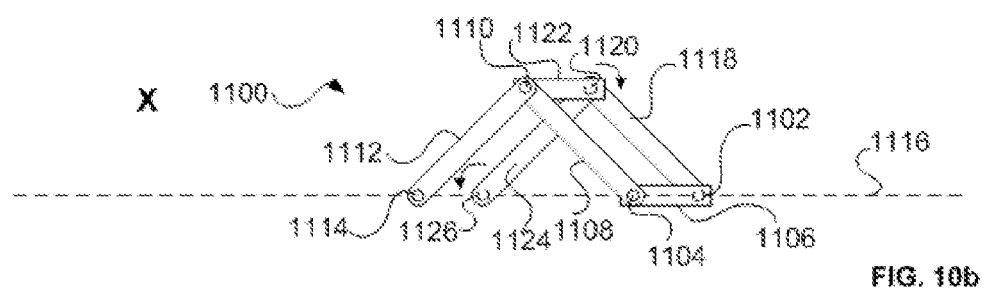
Figure 10C:
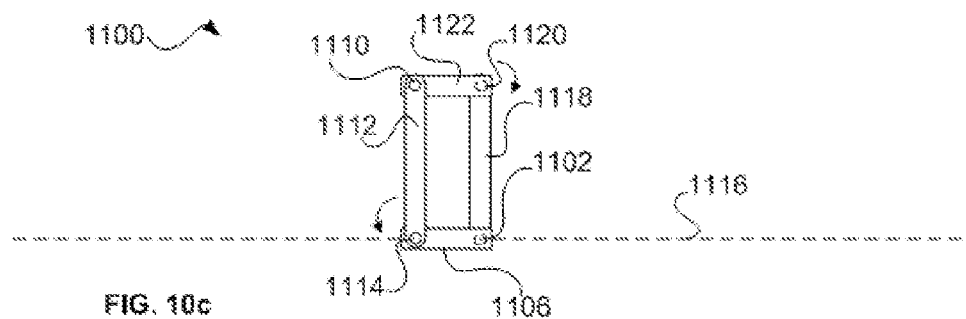
Figure 10D:
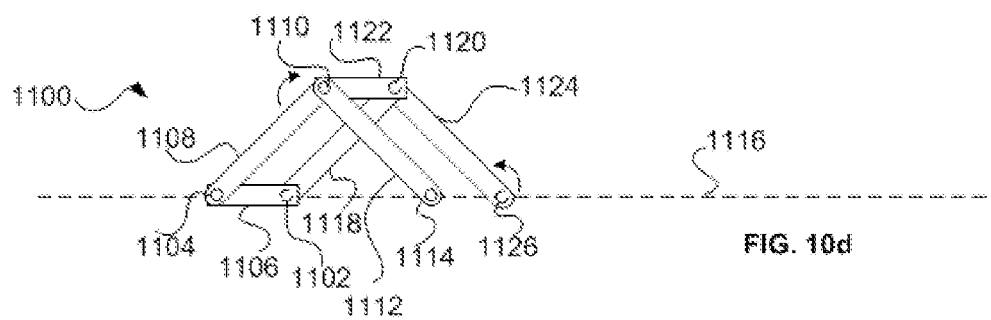
Figure 10E:
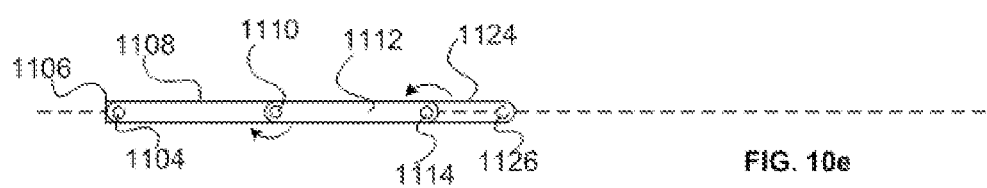
Figure 18H:
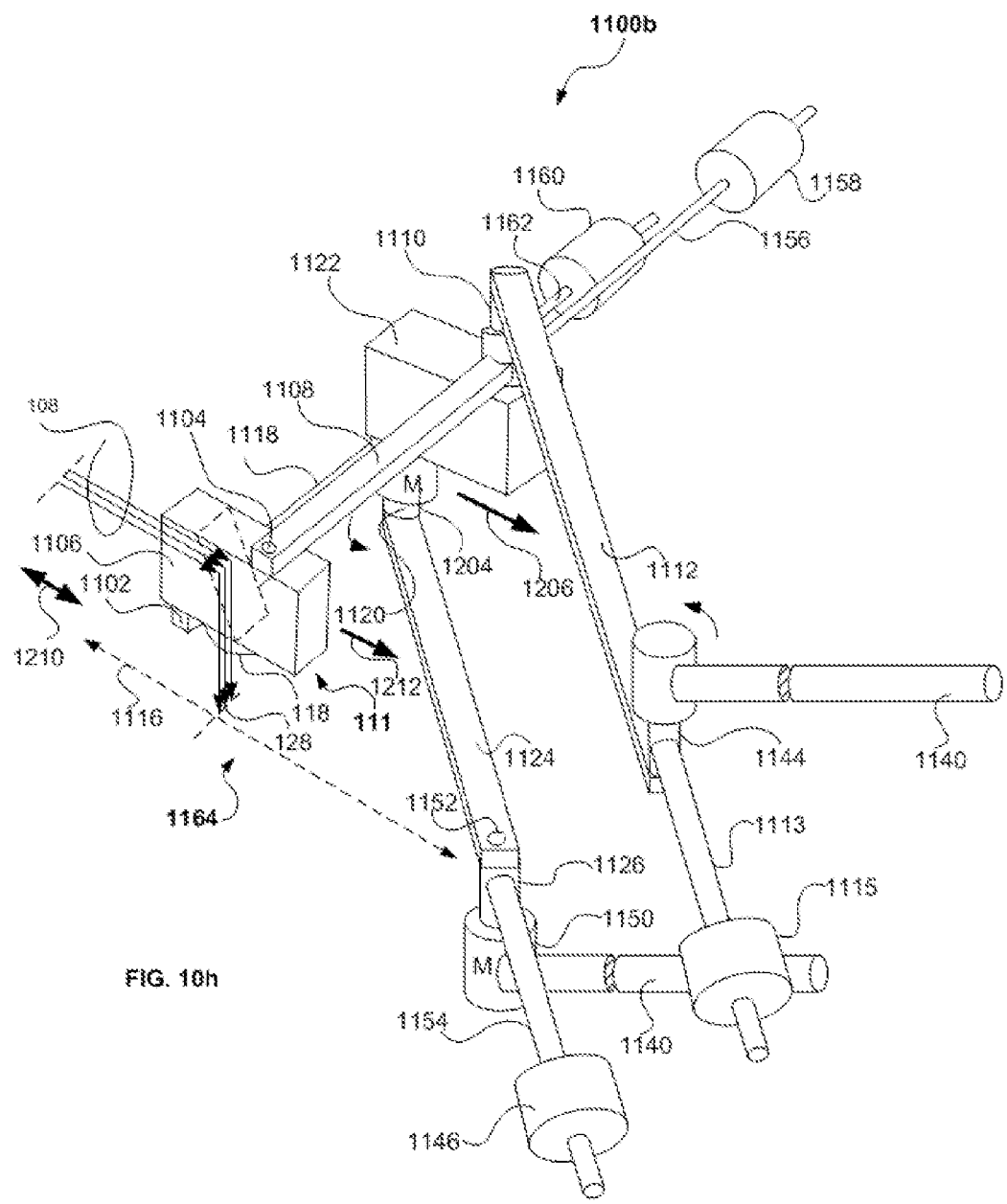

FIGS. 10*b* and 10*f* illustrate scan positions which clearly show the structures of systems 1100 and 1100*a*, respectively. System 1100*a* has all the parts of system 1100 with additional balancing arms 1113 and 1154, which have balancing weights 1115 and 1146, respectively. Balancing arms 1113 and 1154 are attached to arms 1112 and 1124 and axes 1114 and 1126, respectively. System 1100*a* of FIG. 10*f* also shows the driving system that rotates first and second parallelograms (1114, 1110, 1120, 126) and (1110, 120, 1102,1104) CCW and CW, respectively, that includes mounting plate 1136, supporting arm 1140, motor 1150, static wheel 1142, and coupling wheel 1119. Additional arms 1113 and 1154 and weights 1146, and 1115 of system 1100*a* of FIG. 10*f* are needed to balance system 1100*a* and additional base plate 1136, static arm 1140, motor 1150, and coupling wheel 1142, are needed to drive the parallelograms (1114, 1110, 1120, 126) and (1110, 120, 1102, 1104). However, there is no need to describe these additional parts in this explanation, which is focused on the operational principle of systems 1100 and 1100*a*.

Structure of the Parallelogram Scanning System—FIGS. 10*b* and 10*f*

FIGS. 10*b* and 10*f* show that axis 1114 is connected to the most upper arm 1112 of the parallelograms (1114, 1110, 1120, 126) and is face-up. Axis 1114 is supported by bearing 1130 that is attached to base 132 to hold axis 1114 in a fixed position. Axis 1126 is connected to lowest arm 1124 of the parallelograms (1114, 1110, 1120, 126) and is face-down. Block 1122 is a common side of the parallelograms (1110, 120, 1102, 1104) and (1114, 1110, 1120, 126). Arm 1108 of one parallelogram (1110, 120, 1102, 1104) is placed above block 1122 and under arm 1112 and is connected, by axis 1110 to block 1122 and arm 1112. Arm 1118 of the parallelogram (1110, 120, 1102, 1104) is placed under block 1122 and above arm 1124 and is connected, by axis 1120 to block 1122 and arm 1118. Transparent Block 1106 is inserted between arms 1118 and 1108 beneath arm 1108 and above arm 1118. Block 1106 is connected to arm 1108 and 1118 by axes 1104 and 1102, respectively.

The distances between axes 1114 and 1110 and 1126 and 1120 are equal sides (1114, 1110) and (1126, 1120) of parallelogram (1114, 1110, 1120, 126). Similarly, the distances between axes 1110 and 1120 and 1114 and 1126 are equal sides (1110, 1120) and (1114, 1126) of parallelogram (1114, 1110, 1120, 126). The distances between axes 1104 and 1110 and 1102 and 1120 are equal sides (1104, 1110) and (1102, 1120) of the parallelogram (1104, 1110, 1102, 120). Similarly, the distances between axes 1110 and 1120 and 1104 and 1106 are equal sides (1110, 1120) and (1104, 1106) of parallelogram (1110, 120, 1102, 1104). Since side (1114, 1110) is also equal to side (1110, 1104), parallelograms (1114, 1110, 1120, 126) and (1110, 120, 1102, 1104) are identical.

Accordingly, the distance between axes 1114 and 1126 is kept constant for any rotation angle of parallelograms (1114, 1110, 1120, 126) and (1110, 120, 1102, 1104), sides (1126, 1114), (1110, 1120) and (1104, 1106) are parallel to each other and to scanned line 1116. This means that block 1106 maintains a fixed orientation for any scan position of systems 1100 and 1100*a*. Systems 1100 and 1100*a* of FIGS. 10*a*-10*e* and 10*f* are planetary systems similar to system 600 of FIGS. 6*a*-6*h* when axes 1114, 1110, and 1104 of systems 1100 and 1100*a* are analogous to axes 604, 616, and 615 of system 600 of FIGS. 6*a*-6*h*.

The displacement of transparent block 1106 is given by equations (2) and (3) in the description accompanying FIGS. 6*a*-6*h*. From equation (3) above, block 1106 has displacement X along the X-axis, given by equation (3) when R in the above equation (3) is equal to sides (1114, 1110) and (1110, 1104). Displacement X along the X-axis is measured relative to the scan position illustrated by FIG. 10*a*. The origin of coordinate diagram 1101 is related to the initial scan position of block 1106 in FIG. 10*a* and the displacement X is measured relative to this point. According to equation (2) transparent block 1106 has no vertical displacement along the Y-axis and thus is fixed for any scan position on line 1116.

FIGS. 10*a*-10*e* show scanning system 1100 in different scanning positions in general. In all these positions block 1106 stays along straight line 1116 and keeps its orientation along that line.

According to the above explanations for systems 1100 and 1100*a* of FIGS. 10*a*-10*e* and 10*f*, for any scan position, block 1106 moves along straight line 1116 and maintains its fixed reorientation along line 1116. Thus block 1106 may be a part of an optical scanning system, such as scanning head 111 of FIG. 1*a*, for performing a linear scan along a straight line.

Transparent block 1106, illustrated in a side cross-section, includes optical scanning head 111 of FIG. 1*a* and shows lens 118 of this head. FIG. 10*g* shows all the parts of scanning head 111 that block 1106 of FIGS. 10*a*-10*e* and 10*f* include. FIG. 10*f* shows scanned surfaces 1164. Radiation spots 128 (FIG. 10*g*) are projected onto surface 1164 to scan along straight lines.

As mentioned, to avoid vibrations, arms 1113 and 1154 with their balancing weights 1115 and 1146, respectively, are attached to arms 1112 and 1124 to assure that the central of gravity of system 1100*a* is located at the center of axis 1126 on rotational axis 1131. Similarly, arms 1156 and 1162 with their respective balancing weights 1158 and 1160 are attached to arms 1108 and 1118 to assure that the central of gravity of system the system that rotates on axes 1110 and 1120 and around rotational axis 1121 are located at the center of axes 1110 and 1120 and on rotational axis 1121.

The driving system that rotates parallelograms (1114, 1110, 1120, 126) and (1110, 120, 1102, 1104) CCW and CW includes mounting plate 1134. Plate 1134 has mounting holes 1138 to attach plate 1134 to base 1136. Supporting arm 1140 is attached on one of its sides to plate 1134 and on its other side to static coupling wheel 1142. Motor 1150, having axis 1126, is mounted on base 1148 to rotate arms 1154 and 1124 CCW around static axis 1152 that is attached to static wheel 1142. Rotating arm 1124 rotates CCW and carries coupling wheel 1119 around static wheel 1142. Coupling wheel 1119 is mounted on axis 1120.

Coupling wheels 1142 and 1119 are coupled together by coupling belt 1144. Coupling wheel 1119 rotates CCW around static coupling wheel 1142 while both wheels are coupled by belt 1144. Thus coupling belt 1144 causes to wheel 1119 to spin CW and to rotate arms 1108, 1118, 1162 and 1122 and block 1106 in the same direction. When the diameter of coupling wheels 1142 is twice the diameter of coupling wheel 1119, parallelograms (1114, 1110, 1120, 126) and (1110, 120, 1102, 1104) rotate CCW and CW in angular velocities that are related by the ratio of 1:2, respectively, as required for scanning of block 1106 along a straight line.

Three Dimensional Illustration of Parallelogram Scanning System—FIG. 10h

FIG. 10h is a schematic three-dimensional illustration of scanning system 1100b, which is similar to system 1100a of FIG. 10f. System 1100b includes the optical scanning head 111 of FIGS. 1a and 10g. System 1100b differs from system 1100a as follows:
1. Mounting plate 1134 and base 1136 on which plate 1134 is mounted in FIG. 10f are not shown in FIG. 10h.
2. The driving unit that includes coupling wheels 1142 and 1119 and used to propel parallelogram (1110, 120, 1102,1104) of FIG. 10f is replaced by motor 1204 that drives parallelogram (1110, 120, 1102, 1104), in addition to motor 1150 that drives parallelogram (1114, 1110, 1120, 126).

Scanning head 111 projects radiation spots 128 onto scanned surface 1164 and scans them along straight line 1116. Line 1116 is parallel to the orientations of blocks 1106 and 1122, illustrated in the directions along arrows 1212 and 1206, respectively, for any scan position of system 1100b.

Figure 11:
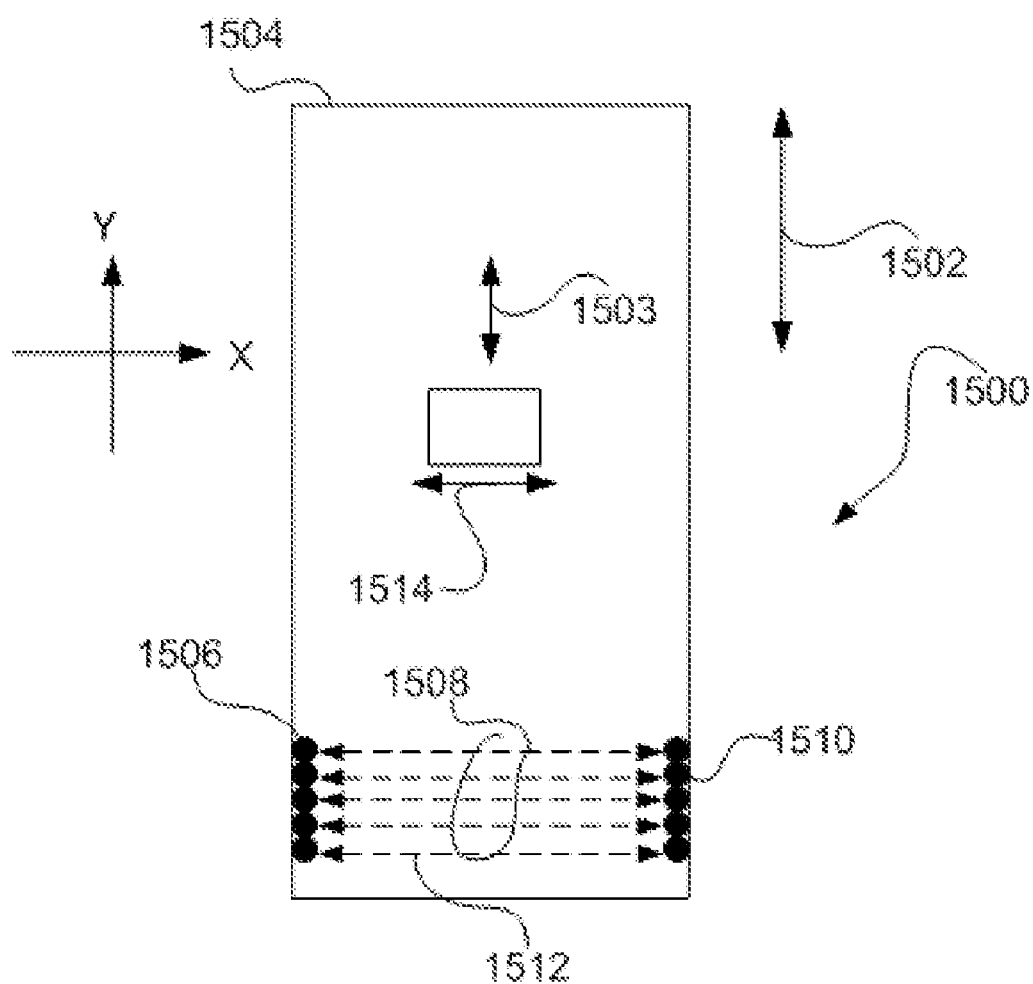
FIG. 11 is a schematic illustration of the relative movement between the scanning optical head and the scanned surfaces that produces an area scan.

Relative Movement Between the Scanning Head and Scanned Surface—FIG. 11

FIG. 11 illustrates a schematic view 1500 showing the relationships between scanned surface 1504 and optical scanning head 111 carried by a scan system (not shown). The scan system may be any of systems 100, 200, 300, 400, 450, 500, 600, 700, 800, 801, 950, 1100, 1100a, and 1100b, illustrated in FIGS. 1a, 2a, 3, 4a, 4e, 5a, 6a, 7a, 8a, 8b, 9, 10a 10f, and 10h, respectively.

Scanning head 111 moves back and forth across scanned surface 1504 along a straight scanning direction oriented in the direction of arrows 1514. Head 111 projects or reads information onto or from straight lines 1508 on scanned surface 1504. Lines 1508 are the scanning tracks. The scanning by head 111 of surface 1504 is performed in the direction of X-axis along arrows 1514. Scan range 1512 across surface 1504 is defined between the extreme scan positions to the left and to the right that are illustrated by spots 1506 and 1510, respectively.

While the scanning system produces a scan along a straight line or lines and produces linear spatial scanning tracks, the scanning speed may not be constant. Thus the distance that the scanning head, such as head 111, moves may not be a linear function of the scanning time, as can be seen from equation (3) above for the scan distance along X-axis.

To produce writing and reading which is not affected by the non-constant scanning speed, the writing rate (in case of writing, printing, and direct imaging) and the acquisition rate (in case of reading or inspecting) should be adjusted to the scan speed. The adjustment may be done using look-up tables in the controlling software that is calibrated according to the performances of the scan system.

When scanning head 111 scans across surface 1504, it produces a line scan. The larger is the number of scanning spots 1506, the wider the scanning line of the line scan.

To convert the line scan into an area scan, a relative movement between head 111 and surface 1504 should be introduced. This relative movement should have a component in direction 1502 that is vertical to direction 1514 of the line scan of head 111. This relative movement may be introduced either by moving surface 1504 in directions 1502 or moving the system that carries head 111 in directions 1504. Relative movement between head 111 and surface 1504 in directions 1502 may also be produced by moving both head 111 and surface 1504 in a relative movement along arrows 1502. The line scan produced by scanning head 111 across surface 1504 in the direction of arrows 1514 along the X-axis and the relative movement between head 111 and surface 1504 in the direction of arrows 1502 along Y-axis create a Cartesian (X-Y) scan. This Cartesian scanning system thus scans the scanned surface in two orthogonal directions (X and Y axes) to produce an area scan.

The speed of the relative movement between head 111 and surface 1504 in direction 1502 may depend upon the scanning speed of head 111 in directions 1514. Accordingly, the relations between the scanning speed of head 111 in directions 1514 and the relative movement between head 111 and surface 1504 in directions 1502 may be adjusted.

The scanning head of the system of FIG. 11 is shown with exemplary scanning head 111 but it may also use any scan component of any of the other scanning systems in the present application or elsewhere.

Different Scanning Modes for Producing Area Scan

There are several modes in which the scanning system can produce an area scan:
1. In the first scanning mode, a lateral linear scan is produced by moving the scanning head in the back and forth directions while producing a longitudinal relative movement between the scanning head and the scanned surface, which is a type of start-stop movement.
2. In the second scanning mode, a lateral linear scan is produced by moving the scanning head in the back and forth directions while producing a continuous longitudinal relative movement between the scanning head and the scanned surface.
3. In the third scanning mode, a lateral linear scan is produced by moving the scanning head in the back and forth directions while producing a continuous longitudinal relative movement between the scanning head and the scanned surface. Additional movement of the scanning head and scanned spots on the scanned surface is introduced by a periodic scan in the longitudinal direction.

In all the scanning modes, the scanning system may be used for writing or reading or both.

Figure 12A:
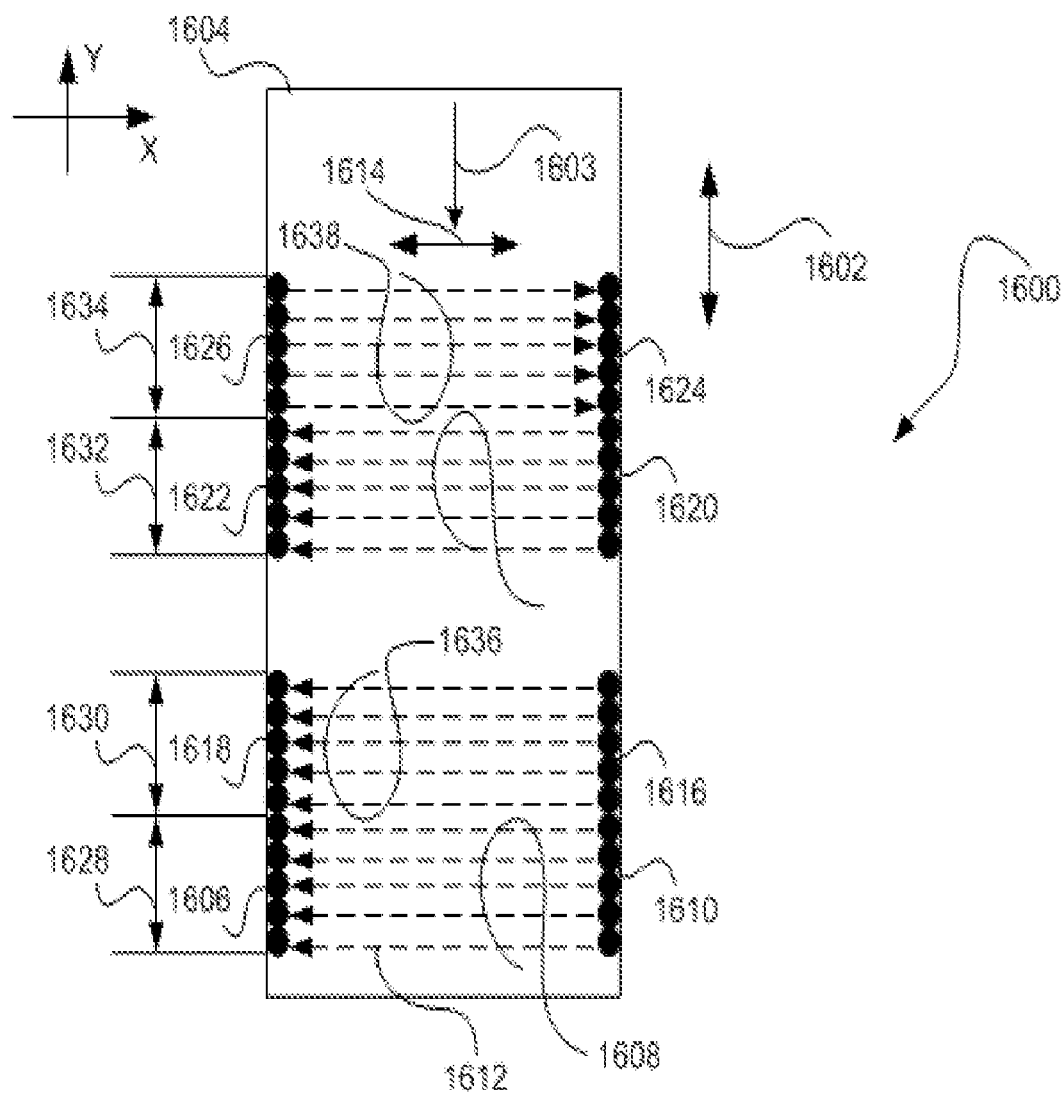
FIGS. 12a and 12b are schematic illustrations of area scans produced by the different scanning modes of the scanning systems according to the present application.

First Scanning Mode—FIG. 12a

FIG. 12a schematically illustrates an area scan 1600 performed on scanned surface 1604. Scanned surface 1604 is movable along arrows 1602 in the +/−Y directions relative to a scanning head, such as scanning head 111 of the scanning systems previously illustrated, which moves back and forth along arrows 1614 in the +/−X direction.

According to one scanning mode, the scanning beams are modulated to produce modulated scanning spots 1610 on scanned surface 1604 while the scanning head moves back and forth in the +/−X direction. However, the modulation allows the scan on surface 1604 only in the −X direction (from right to left). In this situation the lateral scanning range is determined between the initial poison of spots 1610 on the right side of scanned surface 1604 and the position of spots 1610 on the left side of surface 1604, which is marked as spots 1606.

Each of scanning spots 1610 produces a line scan. Thus the combined array of spots 1610 produces scanning band 1608 having width 1628 that starts with line scan 1612. The lateral scan of scanning spots 1610 is produced when surface 1604 is in a static position. One period of the lateral scan is ended when spots 1610 reach their position on the left side of surface 1604 as spots 1606.

When one period of the lateral scan is completed, scanned surface 1604 moves fast in the −Y direction along a distance that is equal to width 1628 of the array of spots 1610. Then it is stops and is ready for the next lateral scan. Surface 1604 completes its movement into the new static position during a time period that is shorter than the time it takes to the scanning head to return to its starting position on the right side of surface 1604. When the scanning head reaches its initial position of the periodic lateral scan, it continues the lateral scan from the right side of surface 1604 with an array of scanning points 1616 and completes the lateral scan on the left side of surface 1604 with points 1616 that are marked as points 1618 on the left side of surface 1604. Points 1616 produce a scanning band 1636 that is similar to scanning band 1608 and has a width 1630 that is similar to width 1628 of scanning band 1608.

This continuous area scan may continue to scan an area by repeating the steps described above. In this scanning mode, the scanning of spots like scanning spots 1610 is done only in one direction when spots 1610 moves in the −X direction. Scanning spots 1610 are modulated not to produce any scan while the scanning head moves in the +X direction into its initial lateral scan-position. Scanning only in one direction gives surface 1604 a relatively long time to move into its new static scan-position, but the scanning head has a duty factor that is less than 50%.

For increasing the duty factor of the area scan, the scanning should be produced in back and forth directions (+/−X direction) along which the scanning head moves. These scans occur when scanned surface 1604 is in a static position. Thus array of spots 1620 scans static surface 1604 in the −X direction with scanning band 1637, which have width 1632, until points 1620 arrive at the left side of surface 1604 as spots 1622. During a time period that is shorter than the time it takes to the scanning head to invert its scanning direction from −X to +X, and to return to the scanning position of array of spots 1626, surface 1604 moves into its new static position. The new static position is spaced from the previous static position of surface 1604 by a distance 1632 that is equal to the width of scanning band 1637 along the Y direction. The next scan is done along +X direction between points 1626 and 1624 by the scanning head with scanning band 1638 having a width 1634. Widths 1632 and 1634 of scanning bands 1637 and 1638, respectively, are similar. This continuous area scan may continue to create any size of area scan by repeating the steps described above.

One drawback of the scanning modes described above is the need to move scanned surface 1604 by a fast start-stop movement which is associated with accelerations and introduces vibrations. A scanning concept in which the start-stop movement of surface 1604 is replaced by a continuous movement of the scanned surface is illustrated in FIG. 12*b*.

Figure 12B:
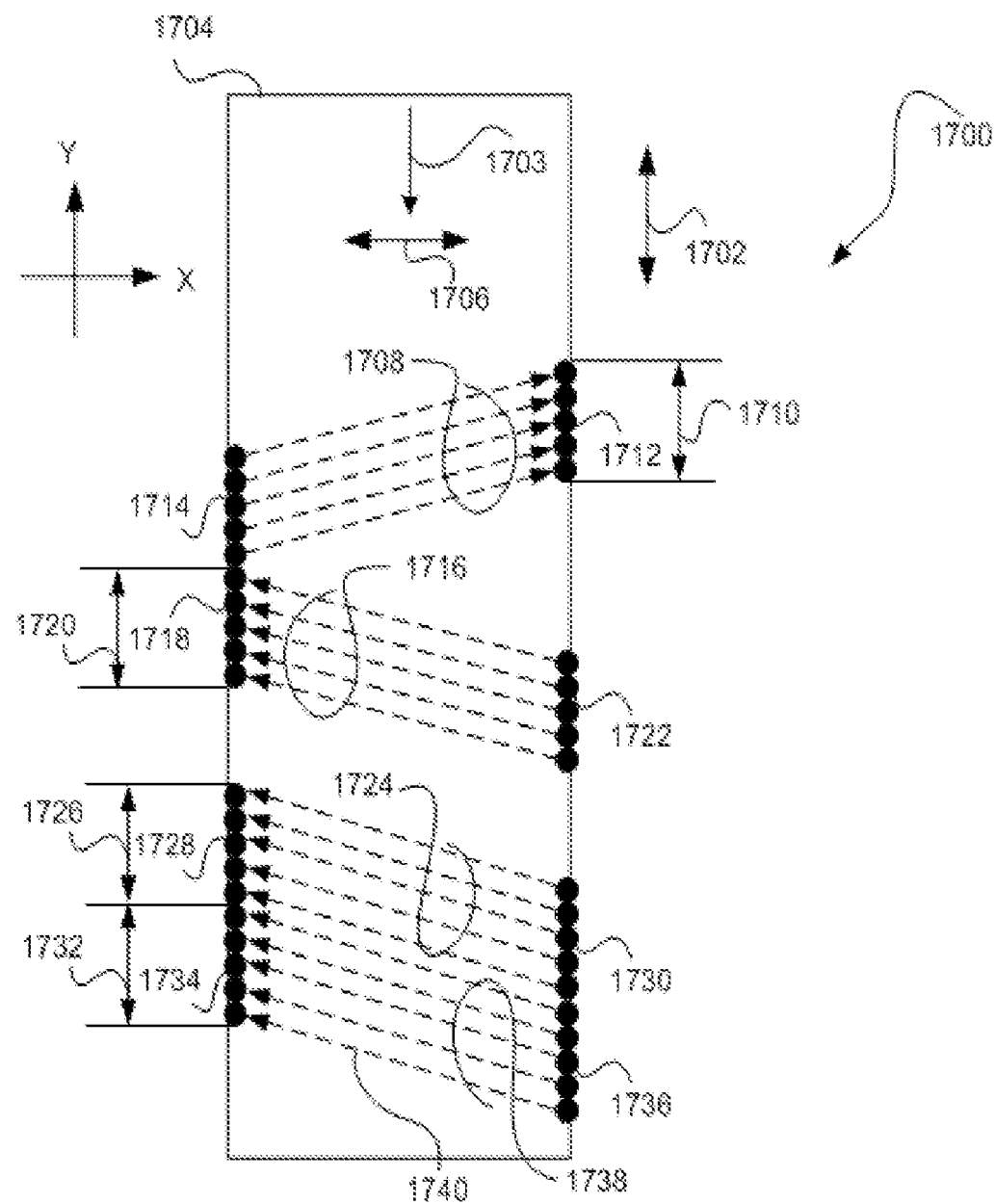

Second Scanning Mode—FIG. 12*b*

FIG. 12*b* schematically shows area scan mode 1700. Scanned area 1704 is movable along arrows 1702 in the +/−Y direction when the scanning head, such as, head 111 of the systems explained ⌐moves back and forth along arrows 1706 in the +/−X direction. In this specific scanning mode, scanned surface 1704 moves in a constant velocity along the −Y direction while the lateral scan is performed by the scanning head only along the −X direction (from the right side of surface 1704 to the left side of surface 1704) between points 1736 and 1734. Scanning points 1736 are modulated in a way that allows a scan only in the −X direction while no scan on surface 1704 is produce when the scanning head returns in the +X direction to its initial lateral scan position at points 1730.

The combination of longitudinal constant velocity of scanned surface 1704 along −Y direction with the lateral scan of points 1736 along the −X direction produces a tilted scan, as shown by line scan 1740. Array of scanning points 1736 produces a band scan 1738 between scanning spots 1736 and 1734, starting with a line scan 1740 and having a width 1732. Scanning band 1738 is followed by next scanning band 1724 having a width 1726, which starts at points 1730 and ends at points 1728. Widths 1732 and 1726 of scanning bands 1738 and 1724, respectively, are similar. During the time period that it takes to the scanning head to complete one period of lateral scan and to start the next following period of lateral scan, scanned surface 1704 moves along the −Y direction a distance 1732 that is equal to the width of scanning band 1738. This means that corresponding spots of scanning points 1730 and 1736 are spaced apart by a distance that is equal to width 1732 of their band 1738. Thus bands 1738 and 1730 are adjacent each other with no overlap or gap. This allows a continuous area scan to be produced by repeating the steps described using a constant velocity of scanned surface 1704.

As will be described scanning, such a continuous area scan cannot be produced with the scanning mode described when the lateral scan is done in the back and forth mode along the +/−X direction. When the lateral scanning is done in the −X direction, a tilted scanning band 1716 is created between scanning points 1722 and 1718, which have a width 1720. However, when the lateral scanning is done in the +X direction, a tilted scanning band 1708 is created between scanning points 1714 and 1712 having a width 1710. The tilting angles of scanning bands 1716 and 1708 are opposite since they are done with the same velocity of scanned surface 1704 along the −Y direction, but with opposite lateral velocities in the −X and +X directions, respectively. The opposite tilting angles of scanning band 1716 and 1708 do not allow joining bands 1716 and 1708 in a way to create a continuous area scan without gaps between the scanning bands.

Third Scanning Mode—FIGS. 13 and 14

FIGS. 13 and 14 illustrate scanning systems that make a continuous area scan without gaps between the scanning bands, even when the scanned surface moves with a longitudinal constant velocity along the −Y direction and the scanning head scans back and forth in both of the lateral directions along the +/−X directions.

FIG. 13 is a schematic illustration of scanning system 1100*b* shown in FIG. 10*h* with an additional optical system that includes modulated radiation sources 1168, beam splitter 1196, radiation detectors 1194, collimating lens 1172, scanning mirror 1178, and mirror 1186.

An array of modulated radiation sources 1168 emits radiation beams 1170 passing through beam splitter 1196 toward collimating lens 1172. Lens 1172 is movable along arrows 1174 to produce adjustable focusing, such as auto-focusing of radiation spots 128 onto line 1190 on scanned surface 1164. Surface 1164 of FIG. 13 is analogous to the scanned surface of the systems previously described, such as, surface 1604 of FIG. 12*a*. Focusing lens 1172 receives beams 1170 and converts them into collimated beams 1176 propagating toward scanning mirror 1178. Scanning mirror 1178 rotates back and forth around rotational axis 1180 in the directions along arrows 1182. Scanning mirror 1178 may be rotated by a motor or stepping motor (not shown). Alternatively, scanning mirror 1178 may be of the type of Micro Electro Mechanical System (MEMS). MEMS devices are commonly used for optical switching in optical communication networks or in the field of video-projectors where they are used as scanning mirrors. Scanning mirror 1178 may also be of any type of electromagnetic or galvanic driven mirror. Scanning mirror 1178 scans beams 1176 and deflects them toward mirror 1186 as scanned beams 1184. Beams 1184 are reflected, by mirror 1186 as scanned beams 108 propagating toward scanning head 111 of scanning system 1100*b*. Beams 108 have a discontinuity 1188, as illustrated by gap 1188 in beams 108. This indicates that mirrors 1186 and 1178, collimating lens 1172, beam splitter 1196, modulated radiation sources 1168, and radiation detectors 1194 are all spaced apart from scanning system 1100*b* by a distance that is larger than actually illustrated. This avoids any interference between them and any of the rotating components of system 1100*b*, such as head 111.

Beams 108 are focused on scanned surface 1164, such as surface 1604 of FIG. 12*a*, and are scanned along line 1116. The way that beams 108 are focused as spots 128 onto scanned surface 1164 and are scanned along line 1116, by scanning system 1100*b*, illustrated in FIG. 10*h*. To produce an area scan, scanned surface 1164, such as, surface 1604 of FIG. 12*a*, moves in the longitudinal direction along arrows 1190 corresponding to arrow 1603 of FIG. 12*a*. At the same time, focusing spots 128 scan back and forth in the lateral direction along line 1116. Scanning mirror 1178 causes focusing spots 128 to have additional scanning movement along line 1190 while scanning spots 128 scan the scanned surface in a back-and-forth motion along line 1116. When the scanned surface is a surface similar to surface 1604 of FIG. 12*a*, which moves in a longitudinal constant velocity in a direction along arrow 1190 and the scanning of spots 128 along arrow 1190 is performed by mirror 1178 in the same speed and direction as the constant velocity of surface 1604, the relative speed between scanned surface 1604 and scanning spots 128 along arrows 1190 is zero. However the lateral scanning speed along arrows 1116 remains the same as it is in scanning system 1100*b* of FIG. 10*h*.

In this situation, the relative movement between the scanned surface and the scanning spots in the longitudinal direction is zero and is similar to the situation illustrated in FIG. 12*a* in which the scanned surface is in a static position during the scan. Accordingly, FIG. 12*a* will be used to explain the scanning mode of the system of FIG. 13 and alternating reference will be made to FIGS. 12*a* and 13.

When scanning mirror 1178 scans beams 1176 to produce zero relative velocity between scanning spots 128 and the scanned surface along arrow 1190, spots 128 scans surface 1164 along line 1116, similar to scanning band 1637 between spots 1620 and 1622 of FIG. 12*a*. At the time that scanning head 111 invert its scanning direction, scanning mirror 1178 quickly rotates back around axis 1180 and returns to its initial scan position to start its next scanning period. During the time after the scanning period starts, scanned surface 1604 moves in the longitudinal direction a distance that is equal to width 1632 of scanning band 1637. Thus when scanning mirror 1178 returns back into its initial scanning position, scanned surface 1604 of FIG. 12*a* has already moved a distance 1632 that is equal to width 1632 of scanning band 1637. Thus the scan in the inverted direction will start at points 1626 at the interface above points 1622. At the time that scanning mirror 1178 starts its next scanning period, the longitudinal relative speed between spots 128 and scanned surface 1604 of FIG. 12*a* is zero again and the scan is performed by a scanning band, like band 1638 between spots 1626 and 1624 of FIG. 12*a*.

This allows creating a continuous area scan by repeating the steps described using a constant velocity of scanned surface 1604 and back-and-forth lateral scanning by scanning head 111.

Third Scanning Mode in Another Scanning System—FIG. 14

FIG. 14 is a schematic illustration of scanning system 950 of FIG. 9 with an additional optical system that includes modulated radiation sources 1068, beam splitter 1072, radiation detectors 1092, collimating lens 1076, scanning mirror 1082, processor 1099, and manipulator 2000.

An array of modulated radiation sources 1068 emits radiation beams 1070 passing through beam splitter 1072 toward collimating lens 1076. Lens 1076 is movable along arrows 1078 to produce adjustable focusing, such as auto-focusing of radiation spots 1054 onto line 1056 on scanned surface 858A. Surface 858A of FIG. 14 is analogous to the scanned surface of the systems previously described, such as, surface 1164 of FIG. 13. Focusing lens 1076 receives beams 1072 and converts them into collimated beams 1080 propagating toward scanning mirror 1082. Scanning mirror 1082 rotates back and forth around rotational axis 1084 in the directions along arrows 1086. Scanning mirror 1082 may be rotated by a motor or stepping motor (not shown). Alternatively, scanning mirror 1082 may be a MEMS or may be of any type of electromagnetic or galvanic driven mirror. Scanning mirror 1082 scans beams 1080 and deflects them toward scanning system 950 as scanned beams 1088.

Beams 1088 are focused onto scanned surface 858A, such as surface 1604 of FIG. 12*a*, and are scanned along lines 1058. The way that beams 1088 are focused as spots 1060 onto scanned surface 858A and scanned along lines 1058, by scanning system 950, is illustrated by FIG. 9. To produce an area scan, the scanned surface, such as, surface 1604 of FIG. 12*a*, moves in the longitudinal direction along arrows 1062 corresponding to the direction of arrow 1603 of FIG. 12*a*. At the same time, focusing spots 1060 scan back and forth in the lateral direction along lines 1058. Scanning mirror 1082 causes focusing spots 1060, to have an additional scanning movement along line 1062 while scanning spots 1060 scan scanned surface 858A in a back and forth motion along lines 1058. When the scanned surface is a surface similar to surface 1604 of FIG. 12*a*, which moves in a longitudinal constant velocity in a direction along arrow 1062 and the scanning of spots 1060 along arrow 1062 is performed in the same speed and direction as the constant velocity of surface 1604, the relative speed between scanned surface 1604 and scanning spots 1060 along arrows 1062 is zero. However the lateral scanning speed along lines 1058 remains the same as it is in scanning system 950 of FIG. 9.

This situation when the relative movement between the scanned surface and the scanning spots in the longitudinal direction is zero is similar to the situation illustrated in FIG. 12a in which the scanned surface is in a static position during the lateral scan. Accordingly, FIG. 12a will be used to explain the scanning mode of the system of FIG. 14 and alternating reference will be made to FIGS. 12a and 14.

In this case, when scanning mirror 1082 scans beams 1080 to produce zero relative velocity between scanning spots 1060 and the scanned surface along arrow 1062, spots 1060 scans the surface along lines 1058 like scanning band 1636 between spots 1620 and 1622 of FIG. 12a. At the time that scanning lens 1050 reverses its scanning direction, scanning mirror 1082 quickly rotates back around axis 1084 and returns to its initial scan position to start its next scanning period. During the time after the scanning period starts, scanned surface 1604 moves in the longitudinal direction a distance equal to width 1632 of scanning band 1637. Thus when scanning mirror 1082 returns back into its initial scanning position, scanned surface 1604 of FIG. 12a has already moved a distance 1632 that is equal to width 1632 of scanning band 1637. Thus the scan in the inverted direction will start at points 1626 at the interface above points 1622. At the time that scanning mirror 1082 starts its next scanning period the longitudinal relative speed between spots 1060 and scanned surface 1604 of FIG. 12a is zero again and the scan is performed by a scanning band, like band 1638 between spots 1626 and 1624 of FIG. 12a.

This allows continuous area scan to be created by repeating the steps described by causing scanned surface 1604 to have a constant velocity and scanning lens 1050 to have a back-and-forth lateral scanning motion.

Scanning mirrors 1178 and 1082 of FIGS. 13 and 14, respectively, scan with a very fast return to their initial scan position. This motion describes a function of the rotating angle of mirrors 1178 and 1082 versus the rotating time of these mirrors, which is similar to a saw-tooth. This saw-tooth function can also be created by a rotating a polygonal mirror, such as polygon 1094 of FIG. 15, which has a rotational axis 1096. Accordingly, polygon 1094 of FIG. 15 may replace scanning mirrors 1178 and 1082 of FIGS. 13 and 14.

Reading Mode—FIG. 14

In the system of FIG. 14, like all the systems previously described, part of the radiation emitted from the scanned surface propagates in the reverse direction along the optical path in which the radiation from radiation sources 1068 propagates onto the scanned surface. The radiation produced by the scanned surface is reflected, by beam splitter 1072, toward radiation detectors 1092, which produce the image of the radiation on the scanned surface. Acquiring the image of the scanned surface as described is done in the reading mode of the system. The illumination of the scanned surface may be produced using the same optical path of the reading mode or may be produced along a different optical path. The image of the scanned surface may be affected by the reflection, scattering, absorption and polarization of the scanned surface.

Auto-Focus Unit—FIG. 14

FIG. 14 also shows an auto focus unit that may be implemented in each of the scanning systems previously described. This auto-focus unit includes radiation detectors 1092, which acquire the image of the scanned surface and produce an electrical signal that is fed by electrical lead 1098 into processor 1099. Processor 1099 processes the signal received from electrical led 1098 and calculates what the position of collimated lens 1076 should be for producing the optimal focusing conditions of scanning spots 1060 projected onto scanned surface 858A. Process 1099 includes a high-pass filter for measuring the spatial frequency of the image received on detectors 1092 as a function of the position of lens 1076. The position of lens 1076 in which processor 1099 measures the highest spatial frequency of the image received on detectors 1092 is the optimal focusing position of lens 1076. According to the measurements and calculations made by processor 1099, processor 1099 sends an electrical command, via led 1074, to manipulator 2000 to move into the optimal focusing position. Manipulator 2000 has carrying means (not shown) to carry collimating lens 1076 into its best focusing position.

Modulation of Radiation Sources

In a writing mode, the described scanning systems may include radiation sources. For example, these sources, like radiation sources 1068 of the system of FIG. 14, are modulated and controlled by a computer (not shown) that stores the image to be written on scanned surface 858A. The on-off modulation of the radiation sources is preformed according to the timing in which the radiation spots should write on the scanned surface or should be in an off mode. This timing depends upon the pattern of the image that should be generated on scanned surface 858A and also depends upon the scanning speed and the number of beams used to produce the scan. This timing is calculated by a computer and is used to modulate the radiation sources for producing the desired image on scanned surface 858A.

Writing and Reading for Computed Radiography System—FIG. 14

In some applications the scanning systems described may be used for illuminating the scanned surface by a writing mode and at the same time are used to read the information of the radiation provided by the scanned surface.

For example, the scanning system of FIG. 14 may be used for the application of Computed Radiography (CR). A CR system includes a plate that stores an X-ray image. When this plate is scanned by red light, it emits, by a photoluminescence or photo-fluorescent process, blue light from every location where the X-ray energy is stored in the plate. The blue light is collected and is converted into a digital image that can be stored in the memory of a computer or other device having digital memory.

Accordingly, the system of FIG. 14 may be used as a CR system for scanning the plate that stores the X-ray image using red radiation sources 1068. At the same time it may be used to read the blue light provided by the scanned plate using radiation detectors 1092 to produce a digital image of the blue light produced by the scanned plate.

CONCLUSIONS RAMIFICATIONS AND SCOPE

Accordingly, it can be seen that various embodiments discussed have one or more of the following advantages. Various aspects provide a linear scanning system that can scan without linear sliding, that can scan very wide scanning formats, that scans at a very high resolution, that scans at very high speed, that has a smooth movement with the capability to hold high accelerations, and/or that can accommodate high accelerations and balance vibrations.

While specific embodiments are above explained, discussed, and shown, various other embodiments and ramifications are possible.

While the embodiments are illustrated with ball bearings, they may include any type of bearings, such as, ceramic bearings, air bearings, magnetic bearings, and air flow bearings.

The scanning systems may include actuators, encoders, and decoders to control the speeds, movements and rotations of the scanning systems or of portions of these systems. This control may include a closed-loop control.

The scanning systems may include an auto-focus system. The auto-focus systems may include means for moving the static lens or the moving scanning lens of the optical scanning head of the scanning system.

The propelling units of the scanning systems may include one or more motors that may be coupled to the moving parts of the scanning systems by coupling belts, coupling chains and/or gear box.

The reflectors of the scanning systems may be mirrors, metal mirrors, dielectric mirrors, prisms, and cube mirrors.

Accordingly, the scope of this invention should be determined by the scope of the following claims and their legal equivalents, and not by the specific embodiments described.

The invention claimed is:

1. A scanning system for writing, printing, direct imaging, plotting, computed radiography, and scanning comprising:
   a. an optical system including:
      i. at least one modulatable radiation source for emitting radiation;
      ii. a movable collimating lens;
      iii. a reflector, and
      iv. a focusing lens;
   b. a mechanical system including:
      i. a first mechanical carrier spinning about a first axis;
      ii. second mechanical carrier spinning about a second axis, said second axis being mounted on said first mechanical carrier and arranged to rotate about said first axis;
      iii. a third mechanical carrier spinning about a third axis, said third axis being mounted on said second mechanical carrier and arranged to rotate about said second axis, and
      iv. a movable surface, and
   c. said collimating lens being arranged to receive said radiation from said one radiation source and to convert said radiation into at least one collimated beam which propagates along an optical path from said collimating lens to said surface via said reflector and said focusing lens to form at least one focused radiation spot on said surface; and
   d. said mechanical system being arranged to cause said third mechanical carrier of said mechanical system to carry said reflector and said focusing lens of said optical system for moving said one focused radiation spot on said surface along a straight line.

2. The scanning system of claim 1, further including a beam splitter and at least one radiation sink for collecting radiation provided by said surface along said optical path in the direction from said surface to said collimating lens, said beam splitter being arranged to direct said radiation onto said at least one radiation sink.

3. The scanning system of claim 2, further including a radiation sink arranged to receive said radiation from said surface and to cause said scanning system to be able to read, acquire images, and perform computed radiography.

4. The scanning system of claim 1 wherein the distance between said first and second axes is equal to the distance between said second and third axes.

5. The scanning system of claim 1 wherein said first and third mechanical carriers are arranged to spin in a first direction and said second mechanical carrier is arranged to spin in a second direction, said first and second directions being opposite.

6. The scanning system of claim 1 wherein said first second and third mechanical carriers are arranged to spin with spinning velocities that are related by the ratio of 1:−2:1.

7. The scanning system of claim 1 wherein said collimating lens is arranged to move and change its position for auto focusing of said one focused radiation spot onto said surface.

8. The scanning system of claim 1 wherein said one of said first, second, and third axes is a mechanical axis selected form the group consisting of ball bearing, air bearings, airflow bearings, magnetic bearings, and ceramic bearings.

9. The scanning system of claim 1 wherein one of said first, second, and third carriers includes balancing means for causing the axis about which it spins to include the center of gravity of one of said first, second, and third carriers.

10. The scanning system of claim 1 wherein said surface is arranged to move with respect to said first axis for producing an area scan.

11. A scanning system for writing, printing, direct imaging, plotting, computed radiography, and scanning, comprising:
    a. an optical system including:
       i. at least one modulatable radiation source for emitting radiation;
       ii. a movable collimating lens;
       iii. a plurality of reflectors, and
       iv. a focusing lens;
    b. a mechanical system including:
       i. first mechanical carrier spinning about first axis;
       ii. second mechanical carrier spinning about second axis, wherein said second axis is mounted on said first mechanical carrier and rotates about said first axis, and
       iii. a movable surface, and
    c. said collimating lens being arranged to receive said radiation from said one radiation source and to convert said radiation into at least one collimated beam which propagates along an optical path from said collimating lens to said surface via said plurality of reflectors and said focusing lens to form at least one focused radiation spot on said surface;
    d. said first and second mechanical carriers being arranged to carry said plurality of reflectors, and
    e. said mechanical system being arranged to cause said second mechanical carrier of said mechanical system to carry said focusing lens of said optical system for moving said one focused radiation spot onto said surface along a straight line.

12. The scanning system of claim 11, further including a beam splitter and at least one radiation sink for collecting radiation provided by said surface along said optical path in the direction from said surface to said collimating lens, said beam splitter being arranged to direct said radiation onto said one radiation sink.

13. The scanning system of claim 12, further including a radiation sink arranged to receive said radiation from said surface and to cause said scanning system to be able to read, acquire images, and perform computed radiography.

14. The scanning system of claim 11 wherein the distance between said first and second axes is equal to the distance between said second axis and the optical axis of said focusing lens.

15. The scanning system of claim 11 wherein said first and second mechanical carriers are arranged to spin in opposite directions.

16. The scanning system of claim 11 wherein said first and second mechanical carriers are arranged to spin with spinning velocities that are related by the ratio of 1:−2.

17. The scanning system of claim 11 wherein said collimating lens is arranged to move and change its position for auto focusing said one focused radiation spot onto said surface.

18. The scanning system of claim 11 wherein said one of said first and second axes is a mechanical axis selected form the group consisting of bearings, air bearings, airflow bearings, magnetic bearings, and ceramic bearings.

19. The scanning system of claim 11 wherein one of said first and second carriers includes balancing means for causing the axis about which it spins to include the center of gravity of one of said first, second, and third carriers.

20. The scanning system of claim 11 wherein said surface is arranged to have relative movement with respect to said first axis for producing an area scan.

21. A method of writing, printing, direct imaging, plotting, producing computed radiography, and scanning, comprising:
   a. providing an optical system including:
      i. at least one modulatable radiation source arranged for emitting radiation;
      ii. a movable collimating lens;
      iii. a reflector, and
      iv. a focusing lens;
   b. providing a mechanical system including:
      i. a first mechanical carrier arranged to spin about a first axis;
      ii. a second mechanical carrier arranged to spin about a second axis, said second axis being mounted on said first mechanical carrier and arranged to rotate about said first axis;
      iii. a third mechanical carrier arranged to spin about a third axis, said third axis being mounted on said second mechanical carrier and arranged to rotate about said second axis, and
      iv. a movable surface, and
   c. providing a collimating lens arranged to receive said radiation from said one radiation source for converting said radiation into at least one collimated beam which propagates along an optical path from said collimating lens to said surface via said reflector and said focusing lens for forming at least one focused radiation spot on said surface; and
   d. causing said third mechanical carrier of said mechanical system to carry said reflector and said focusing lens of said optical system for moving said one focused radiation spot on said surface along a straight line.

22. The method of claim 21 wherein said scanning system further includes a beam splitter and at least one radiation sink for collecting radiation provided by said surface along said optical path in the direction from said surface to said collimating lens, said beam splitter being arranged to direct said radiation onto said at least one radiation sink.

23. The method of claim 22 wherein said radiation sink is arranged to acquire images of radiation received from said surface for causing said scanning system to be able to read, detect, inspect, acquire images, perform computed radiography, and scan.

24. The method of claim 21, further including causing said distance between said first and second axes to be equal to the distance between said second and third axes.

* * * * *